United States Patent
Laftchiev et al.

(10) Patent No.: US 11,698,946 B2
(45) Date of Patent: Jul. 11, 2023

(54) SYSTEM AND A METHOD FOR TRAINING A NEURAL NETWORK HAVING AUTOENCODER ARCHITECTURE TO RECOVER MISSING DATA

(71) Applicant: Mitsubishi Electric Research Laboratories, Inc., Cambridge, MA (US)

(72) Inventors: Emil Laftchiev, Cambridge, MA (US); Qing Yan, Chicago, IL (US); Daniel Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 316 days.

(21) Appl. No.: 17/197,248

(22) Filed: Mar. 10, 2021

(65) Prior Publication Data
US 2022/0292301 A1    Sep. 15, 2022

(51) Int. Cl.
*G06N 3/08* (2023.01)
*G06F 18/214* (2023.01)
*G16Y 40/35* (2020.01)
*H04L 67/12* (2022.01)
*G16Y 40/10* (2020.01)

(52) U.S. Cl.
CPC .............. *G06F 18/214* (2023.01); *G06N 3/08* (2013.01); *G16Y 40/10* (2020.01); *G16Y 40/35* (2020.01); *H04L 67/12* (2013.01)

(58) Field of Classification Search
CPC ........ G06F 18/214; G06N 3/08; G06N 3/045; G06N 3/088; G16Y 40/10; G16Y 40/35; H04L 67/12

USPC .......................................................... 382/159
See application file for complete search history.

(56) References Cited

U.S. PATENT DOCUMENTS

2021/0174974 A1*   6/2021   Mino ..................... G16Y 40/35

OTHER PUBLICATIONS

Zhuang, Y., Ke, R. and Wang, Y. (2019), Innovative method for traffic data imputation based on convolutional neural network. IET Intell. Transp. Syst., 13: 605-613. https://doi.org/10.1049/iet-its.2018.5114 (Year: 2019).*

* cited by examiner

*Primary Examiner* — Neil R McLean
(74) *Attorney, Agent, or Firm* — Gennadiy Vinokur; Hironori Tsukamoto

(57) ABSTRACT

A computer-implemented method of training an autoencoder to recover missing data is provided. The autoencoder includes an encoder for encoding its inputs into a latent space and a decoder for decoding the encodings from the latent space. The method comprises creating a first training set including a valid data set of multiple dimensions, and training the encoder and the decoder in a first training stage using the first training set to reduce a difference between the valid data set provided to the encoder and a data set decoded by the decoder. The method further comprises creating a second training set comprising an invalid data set, and training the encoder in a second training stage using the second training set to reduce a difference between encodings of valid data instances and encodings of their corresponding invalid data instances.

14 Claims, 21 Drawing Sheets

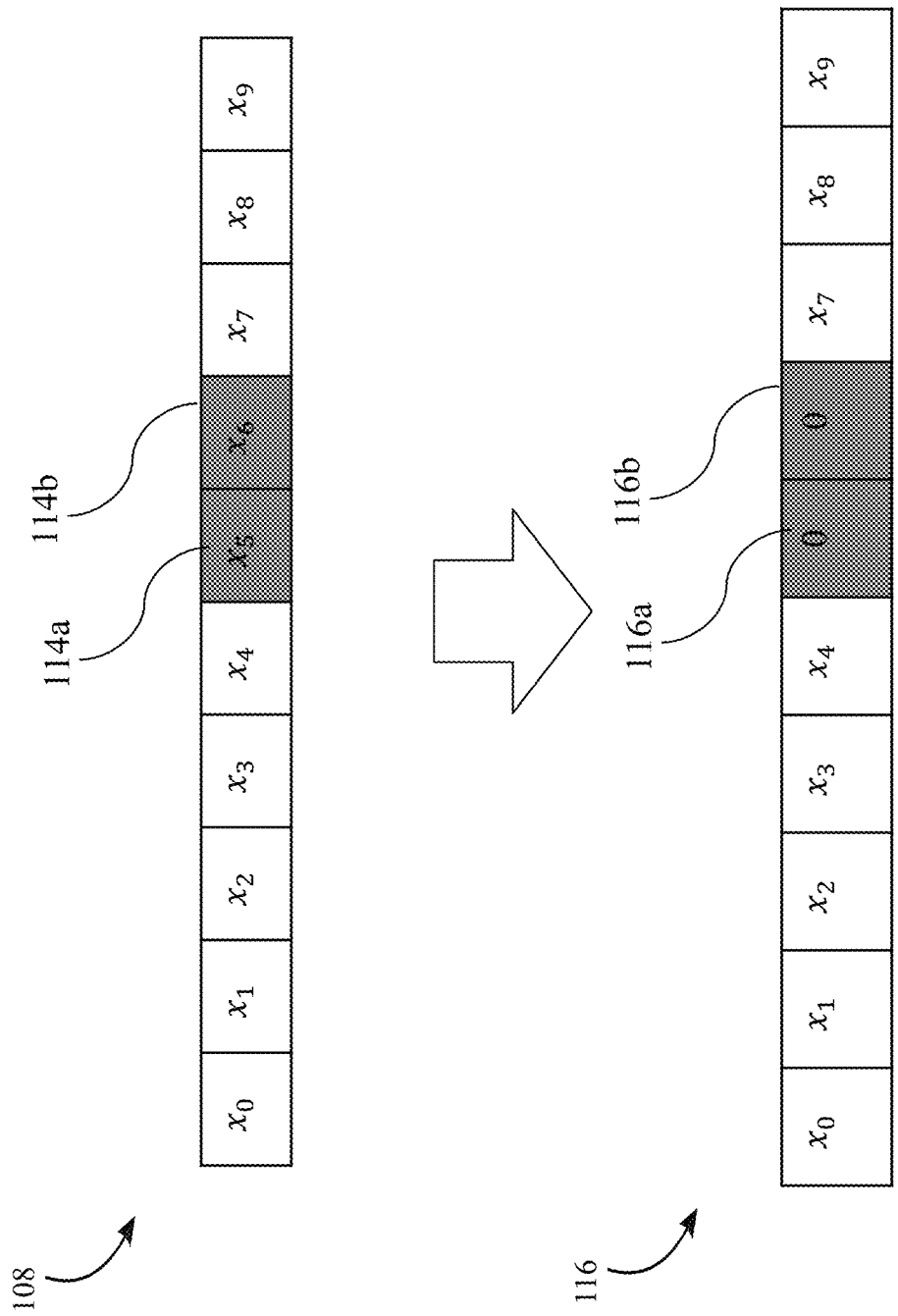

Algorithm 1: Stack AE

Require: Evaluation function $F$ to check the performance of model, smaller is better Train Auto-Encoder $(E, D)$ on $\mathcal{X}$;
Set $n = 0$, Model = identity;
while $n < MaxIte$ do
    Set Model' $= D \circ E_n \circ$ Model;
    Train $E_n$ to minimize
    $\|E_n \circ \text{Model}(x_o) - E(x)\|_2^2$;
    Compute $V' = F(\text{Model}')$, $V_0 = F(\text{Model})$;
    if $V' < V_0$ then
        Set Model = Model';
    else
        break;
    end
end
return: Model

FIG. 5

| Dataset | Train Size | Test Size | Num Dimensions | Series Length | Num Missing Sensor In Test |
|---|---|---|---|---|---|
| FingerMovements | 316 | 100 | 28 | 50 | {5, 10, 15, 20} |
| HandMovementDirection | 160 | 74 | 10 | 400 | {2, 4, 6, 8} |
| NATOPS | 180 | 180 | 24 | 51 | {5, 10, 15, 20} |
| RacketSports | 151 | 152 | 6 | 30 | {1, 2, 3, 4} |

FIG. 6

| Dataset | Number of layers | Number of Channel | Dimension of latent space |
|---|---|---|---|
| CNC | 8 | 64 | 8 |
| MOCAP | 5 | 128 | 32 |
| NATOPS | 6 | 64 | 10 |
| Racket Sports | 6 | 32 | 3 |
| Finger Movement | 7 | 64 | 12 |
| Hand Movement | 6 | 64 | 4 |

FIG. 7

SYSTEM AND A METHOD FOR TRAINING A NEURAL NETWORK HAVING AUTOENCODER ARCHITECTURE TO RECOVER MISSING DATA

TECHNICAL FIELD

The present disclosure relates generally to imputation of data and more particularly to a system and a method for training a neural network having autoencoder architecture to recover missing data.

BACKGROUND

Rapid advances in information and communications technologies (ICT) have made deployments of a large number of sensors used for remote monitoring, data collection, and device control. These developments have increased size of industrial systems such as Supervisory Control and Data Acquisition (SCADA) systems, power plants, and Internet of Things (IoT). However, the larger number of sensors has not positively affected reliability of sensor data collection. For instance, IoT deployments frequently use consumer-grade ICT components (such as sensors) which can become faulty and/or inaccessible. Also, both the SCADA and the IoT deployments are affected by customer choices related to a grade or level of deployment. Further, the sensor deployments are affected by tasks such as routine maintenance that may render groups of sensors inaccessible for scheduled periods of time. Such factors may lead to inaccessibility of the sensors or systematic missing of sensor data/readings. The inaccessible or missing sensor data creates problem when the inaccessible or missing sensor data are intended to be used in analytical formulas, AI algorithms, and rule-based monitoring algorithms, whose goal is to monitor and optimize performance, and detect anomalies. Thus, the missing of the sensor data severely affects ability to automatically monitor and operate the SCADA and the IoT deployments, and can result in catastrophic failure of operation.

Additionally, the missing of the sensor data hinders adoption of machine learning (AI) algorithms in critical industries such as power generation and water purification, highly customizable products like rail cars and heating, ventilation, and air conditioning (HVAC) systems. For example, the AI algorithms in most cases depend on a fixed set of inputs that are to be obtained from the sensors. However, due to the inaccessibility of the sensors or the systematic missing of sensor data/readings, the fixed set of inputs cannot be ensured for the AI algorithms.

Hence, there is a need to resolve the problem of inaccessibility of the sensors or the systematic missing of sensor data in a manner suitable for various industrial systems.

SUMMARY

It is an object of some embodiments to provide a system and a method for training a neural network having autoencoder architecture to recover data from inaccessible (or permanently missing) sensors. It is also an object to some embodiments to provide a self-supervised approach for training the autoencoder. Additionally or alternatively, it is an object to some embodiments to recover missing data using the trained autoencoder, and use the recovered data to improve operation via optimization or anomaly detection.

It is an object of some embodiments to recover missing sensor data from observed data (i.e., data obtained from accessible sensors). Some embodiments are based on realization that cause of difficulty in the missing data recovery is the lack of interdependency of sensing data. For example, input data includes measurements of two sensors, where one sensor measures a velocity of a vehicle and another sensor measures an ambient temperature. If the sensor measuring the ambient temperature stops providing measurements, it may be difficult to recover the ambient temperature from the measurements of the velocity. Further, if subsequent applications depend on the measurements of both the sensors, the lack of the measurements from one of the sensors may break operation of the subsequent applications in its entirety.

Further, in practical scenarios, there are different sensors measuring data that have at least some unknown relationship. An example of such a relationship can be observed in sensors measuring power plant operation. Some embodiments are based on recognition that determining the unknown relationship is challenging as measurements in original data-space of the sensors are noisy and the unknown relationship includes a complex non-linear transformation. For example, in case of the power plant, thermodynamic relationship in the power plant is complex and requires extensive domain knowledge to elucidate. Such complex interdependency makes the recovery of the missing data, in the original data-space, difficult.

Some embodiments are based on the realization that efficient encoding of measurements of the sensors may find a relationship among the measurements, because encoding methods are used to find reduced order embeddings of data that summarize important relationships in the original data-space. In addition, some embodiments are based on the realization that recovery of the missing data in space of the efficient encoding is easier because embedding itself can be used as a label that describes a relationship between the missing data and the observed data. Even though such an efficient encoding can be determined, determining the efficient encoding for arbitrary combinations of measured data in various sensing and/or IoT applications is challenging.

Some embodiments are based on the realization that an autoencoder can determine such an efficient encoding in an unsupervised manner. The autoencoder is a type of an artificial neural network used to learn efficient data codings in an unsupervised manner. The autoencoder includes an encoder and a decoder. The encoder encodes input data from the original data-space into a latent space represented by the vector of numerical values 'h'. In other words, the encoder provides a mapping between the input data in the original data-space and a latent space representation of the input data. The decoder decodes the encodings from the latent space to an estimate of the input data, i.e., reconstructs the input data. In an embodiment, the input data may be multidimensional time series data. To that end, the autoencoder determines an efficient latent space for the encoded data and the decoded data that may capture relationship of different dimensions of the input data.

Some embodiments are based on an observation that when the autoencoder is trained on a full data set (i.e., measurements of all the sensors), both the encoder and the decoder are optimized so that the output of the autoencoder is approximately equal to the input data. In other words, the decoder learns to decode the input data and to an extent captures time series dynamics. Some embodiments are based on further observation that missing sensor data from the input data introduces noise in the mapping provided by the encoder, and the introduced noise further manifests in the reconstructed data. Therefore, effect of the missing sensor data is mostly manifested in the encoder.

Some embodiments are based on realization that the autoencoder can be trained in multi-stages to improve the mapping of the encoder in the face of the missing sensor data. The autoencoder is trained in two stages, namely, a first training stage and a second training stage.

At first, a first training set is created. The first training set includes a valid data set of multiple dimensions. In some embodiments, the valid data set is unlabeled data set. At an instant of time, the valid data set includes multiple valid data points having values within a range of valid values of their corresponding dimensions. For example, a given industrial system includes 'n' sensors. Measurement of each sensor, at an instant of time, corresponds to the valid data points. The measurement of each sensor (i.e., the valid data point value) is within a range of valid values of respective sensors. For example, the range of valid values can be 0.1 to 1. The time instants at which the measurements of the 'n' sensors are obtained are referred to as valid instances. Since the first training data set includes measurements of all the sensors, the first training data set may be referred to as the full data set or a full set of measurements. Further, the autoencoder is trained in the first training stage using the first training data set.

The valid data set is applied as input data to the encoder. The encoder is configured to generate a latent space representation of the valid data set. The latent space representation is a lower dimensional representation of the valid data set. In particular, the encoder generates labels for the valid data set which is received as unlabeled data set at the input of the encoder.

According to an embodiment, the encoder is a deep neural network. Further, the decoder is configured to reconstruct the valid data set from the latent space representation of the valid data set. To that end, the decoder outputs reconstructed valid data set. The autoencoder is trained using a reconstruction loss function that minimizes a difference between the reconstructed valid data set and the valid data set. Further, a second training dataset is created for the second training stage.

The second training set comprises an invalid data set. For instance, a given industrial system may include nine sensors. At an instant of time, each sensor outputs the valid data point (or measurements) having value within the range of valid values of respective sensors. For such a case, the valid data set may include nine valid data points $(x_0, x_1, \ldots, x_9)$ having values within the range of valid values. One or more valid data points of the valid data set, for example, valid data points $x_0$ and $x_1$, are replaced with invalid data points. Values of the invalid data points lie outside of the range of valid values. For example, if the range of valid values is 0.1 to 1, then the values of the invalid data points can be zero which lies outside of the range of valid values. Therefore, the valid data points $x_0$ and $x_1$ are replaced with zero. As a result, the invalid data set is created. Therefore, the invalid data set includes the valid data points $(x_2, x_3, x_4, x_5, x_6, x_7, x_8, x_9)$, and invalid data points $x_0$ and $x_1$ having values outside of the range of valid values (e.g., zero). Since the invalid data set does not include measurements (i.e., the valid data points) of all the sensors, the invalid data set may be contemplated as an incomplete data set or an incomplete set of measurements. Further, the autoencoder is trained in the second training stage using the second training data set.

In the second training stage, the latent space representations provided by the encoder in the first training stage is used to learn a new encoder that maps to the latent space representations of the valid data set in the face of the missing sensor data. The invalid data set is applied as input data to the encoder. The encoder is configured to output a latent space representation of the invalid data set. The encoder is trained using an encoding loss function that minimizes a difference between the latent space representation of the invalid data set and the latent space representation valid data set. As a result, a retrained encoder is learned. Some embodiments are based on the realization that the encoder can be trained for different invalid data sets. For example, after the encoder is retrained for the invalid data set, the retrained encoder is trained again for another invalid data set. As a result of such training of the encoder, the encoder becomes a model of models, each applicable to a different subset of available input values.

At the end of the second training stage, the new encoder is learned. The new encoder maps to the original latent space representation (i.e., the latent space representations of the valid data set) even in the face of the missing sensor data. In other words, the new encoder learns how to map the latent space representations of the valid data set in the face of the missing sensor data.

To that end, an embodiment, the new encoder is learned such that when the invalid data set is applied to the new encoder, the new encoder generates the latent space representations of the corresponding valid data set. In the second training stage, only the encoder is trained to learn the new encoder, and the decoder remains same.

According to an embodiment, the multi-stage training procedure is a form of self-supervised approach, where the first training stage includes learning latent space representations using the full data set and the second training stage includes learning how to map to the same latent space representations under missing data from different sensors. Further, in the multi-stage training procedure, the latent space representations are interpreted as labels, and only a single predictive model (the encoder) is optimized for the missing sensor data. Thereby, by performing the multi-stage training procedure, the unsupervised approach is transformed to a supervised approach which makes the autoencoder robust to the missing sensor data.

Accordingly one embodiment discloses a computer-implemented method of training a neural network with an autoencoder architecture including an encoder for encoding its inputs into a latent space and a decoder for decoding the encodings from the latent space. The method comprises: creating a first training set including a valid data set of multiple dimensions, such that each valid instance of the valid data set includes multiple valid data points having values within a range of valid values of their corresponding dimensions; training the encoder and the decoder of the neural network in a first training stage using the first training set to reduce a difference between the valid data set provided to the encoder and a data set decoded by the decoder; creating a second training set comprising an invalid data set formed by replacing at least some valid data points of the valid instances with invalid data points having values outside of the range of valid values of their corresponding dimensions; and training the encoder of the neural network in a second training stage using the second training set to reduce a difference between encodings of the valid data instances and encodings of their corresponding invalid data instances.

Accordingly, another embodiment discloses a system for training a neural network with an autoencoder architecture including an encoder for encoding its inputs into a latent space and a decoder for decoding the encodings from the latent space. The system comprises at least one processor; and memory having instructions stored thereon that, when executed by the at least one processor, cause the system to: create a first training set including a valid data set of multiple dimensions, such that each valid instance of the valid data set includes multiple valid data points having values within a range of valid values of their corresponding dimensions; train the encoder and the decoder of the neural network in a first training stage using the first training set to reduce a difference between the valid data set provided to the encoder and a data set decoded by the decoder; create a second training set comprising an invalid data set formed by replacing at least some valid data points of the valid instances with invalid data points having values outside of the range of valid values of their corresponding dimensions; and train the encoder of the neural network in a second training stage using the second training set to reduce a difference between encodings of the valid data instances and encodings of their corresponding invalid data instances.

Accordingly, another embodiment discloses a data recovery system for producing a full set of measurements of a set of sensors from an incomplete set of measurements missing a measurement from at least one sensor in the set of sensors. The data recovery system comprises at least one processor; and memory having instructions stored thereon that, when executed by the at least one processor, cause the data recovery system to: replace the missing measurement in the incomplete set of measurements with an invalid value outside of a range of valid values of the missing measurement to complete the incomplete set of measurements; process the completed set of measurements using an autoencoder to produce the full set of measurements with a recovered value of the missing measurement, wherein the autoencoder is a neural network learned based on a multi-stage training procedure; and output the full set of measurements with the recovered value of the missing measurement.

BRIEF DESCRIPTION OF THE DRAWINGS

FIG. 1C shows a schematic for creating a second training dataset, according to some embodiments.

FIG. 5 shows a stack autoencoder (AE) training algorithm, according to some embodiments.

FIG. 6 is a tabular column showing details of different datasets, according to some embodiments.

FIG. 7 shows a tabular column including network details for the stack AE, according to some embodiments.

DETAILED DESCRIPTION

Figure 1A:
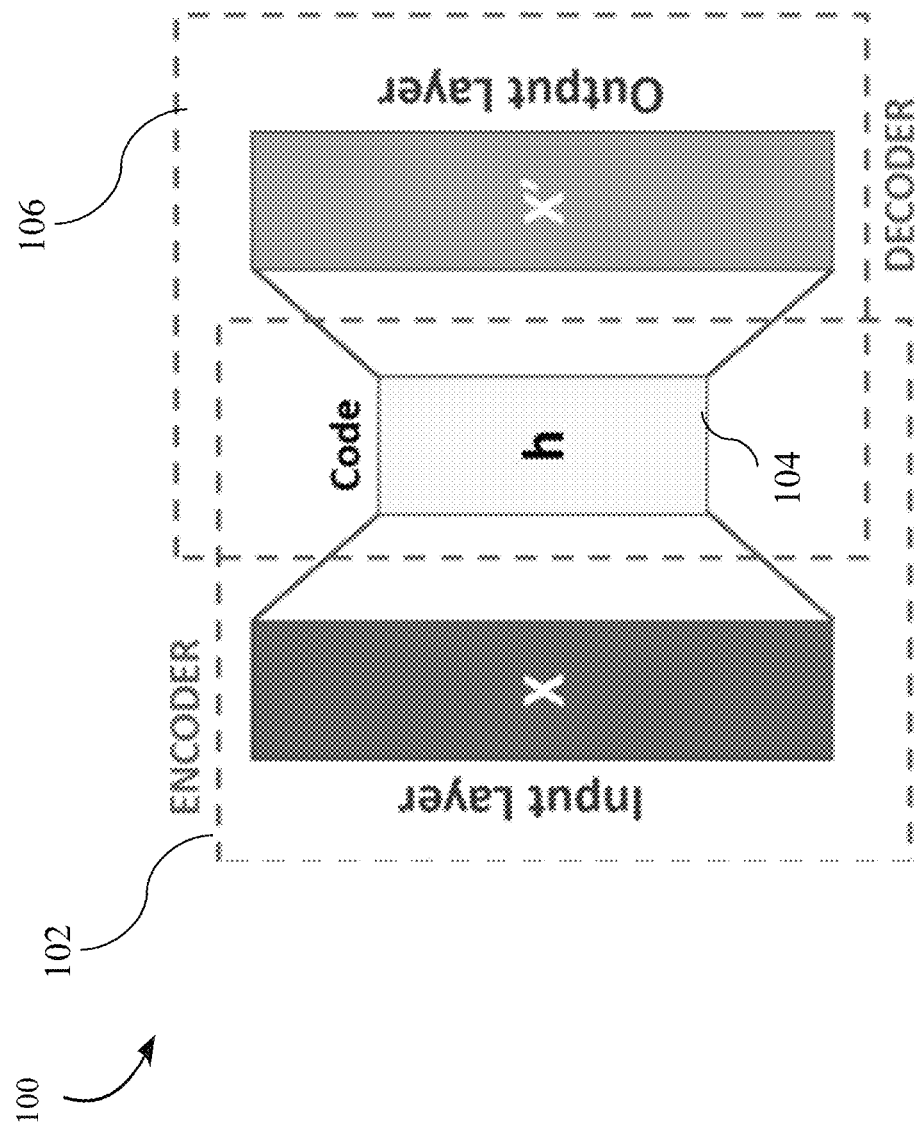
FIG. 1A shows a schematic of an exemplary autoencoder, according to some embodiments.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Sensors are installed in industrial systems such as Supervisory Control and Data Acquisition (SCADA) systems, Heating, Ventilation, and Air Conditioning (HVAC) system, power plants, Internet of Things (IoT), and the like. One or more sensors of the sensors may become inaccessible. The inaccessibility of the one or more sensors may be due to shutting down portions of a large modular system for maintenance, customer choices, and unexpected failure of the one or more sensors. Due to inaccessibility of the one or more sensors, data (or measurements) from the one or more sensors may not be obtained.

It is an object of some embodiments to recover missing data (i.e., data associated with the inaccessible sensors (also referred as missing sensors)) from observed data (i.e., data obtained from accessible sensors). Some embodiments are based on realization that cause of difficulty in recovering the missing data is in lack of interdependency of sensing data. For example, input data includes measurements of two sensors, where one sensor measures a velocity of a vehicle and another sensor measures an ambient temperature. If the sensor measuring the ambient temperature stops providing measurements, it may be difficult to recover the ambient temperature from the measurements of the velocity. Further, if subsequent applications depend on the measurements of both the sensors, the lack of one sensor measurement may break operation of the subsequent applications in its entirety.

Further, in practical scenarios, there are different sensors measuring data that have at least some unknown relationship. An example of such a relationship can be observed in sensors measuring power plant operation. Some embodiments are based on recognition that determining the unknown relationship is challenging as measurements in original data-space of the sensors are noisy and the unknown relationship includes a complex non-linear transformation. For example, in case of the power plant, thermodynamic relationship in the power plant is complex and requires extensive domain knowledge to elucidate. Such complex interdependency makes the recovery of the missing data in the original data-space difficult.

Some embodiments are based on the realization that efficient encoding of measurements of the sensors may find a relationship among the measurements, because encoding methods are used to find reduced order embeddings of data that summarize important relationships in the original data-space. In addition, some embodiments are based on the realization that recovery of the missing data in space of the efficient encoding is easier because embedding itself can be used as a label that describes a relationship between the missing data and the observed data. Even though such an efficient encoding can be determined, determining one for arbitrary combinations of measured data in various sensing and/or IoT applications is challenging.

Some embodiments are based on the realization that an autoencoder can determine such an efficient encoding in an unsupervised manner. The autoencoder is a type of artificial neural network used to learn efficient data codings in the unsupervised manner. FIG. 1A shows a schematic of an exemplary autoencoder 100, according to some embodiments. The autoencoder 100 includes an encoder 102 and a decoder 106. The encoder 102 encodes input data from the original data-space into a latent space 'h' 104. In other words, the encoder 102 provides a mapping between the input data in the original data-space and a latent space representation of the input data. The decoder 106 decodes the encodings from the latent space to an estimate of the input data, i.e., reconstructs the input data. In an embodiment, the input data may be multidimensional time series data. To that end, the autoencoder 100 determines an efficient latent space for the encoded data and the decoded data that may capture relationship of different dimensions of the input data.

Some embodiments are based on an observation that when the autoencoder 100 is trained on a full data set (i.e., measurements of all the sensors), both the encoder 102 and the decoder 106 are optimized so that the output of the autoencoder 100 is approximately equal to the input data. In other words, the decoder 106 learns to reproduce the input data and to an extent captures time series dynamics. Some embodiments are based on further observation that missing sensor data from input data introduces noise in the mapping provided by the encoder 102, and the introduced noise further manifests in the reconstructed data. Therefore, effect of the missing data is mostly manifested in the encoder 102.

Some embodiments are based on realization that the autoencoder 100 can be trained in multi-stages to improve the mapping of the encoder 108 in face of the missing sensor data.

Figure 1B:
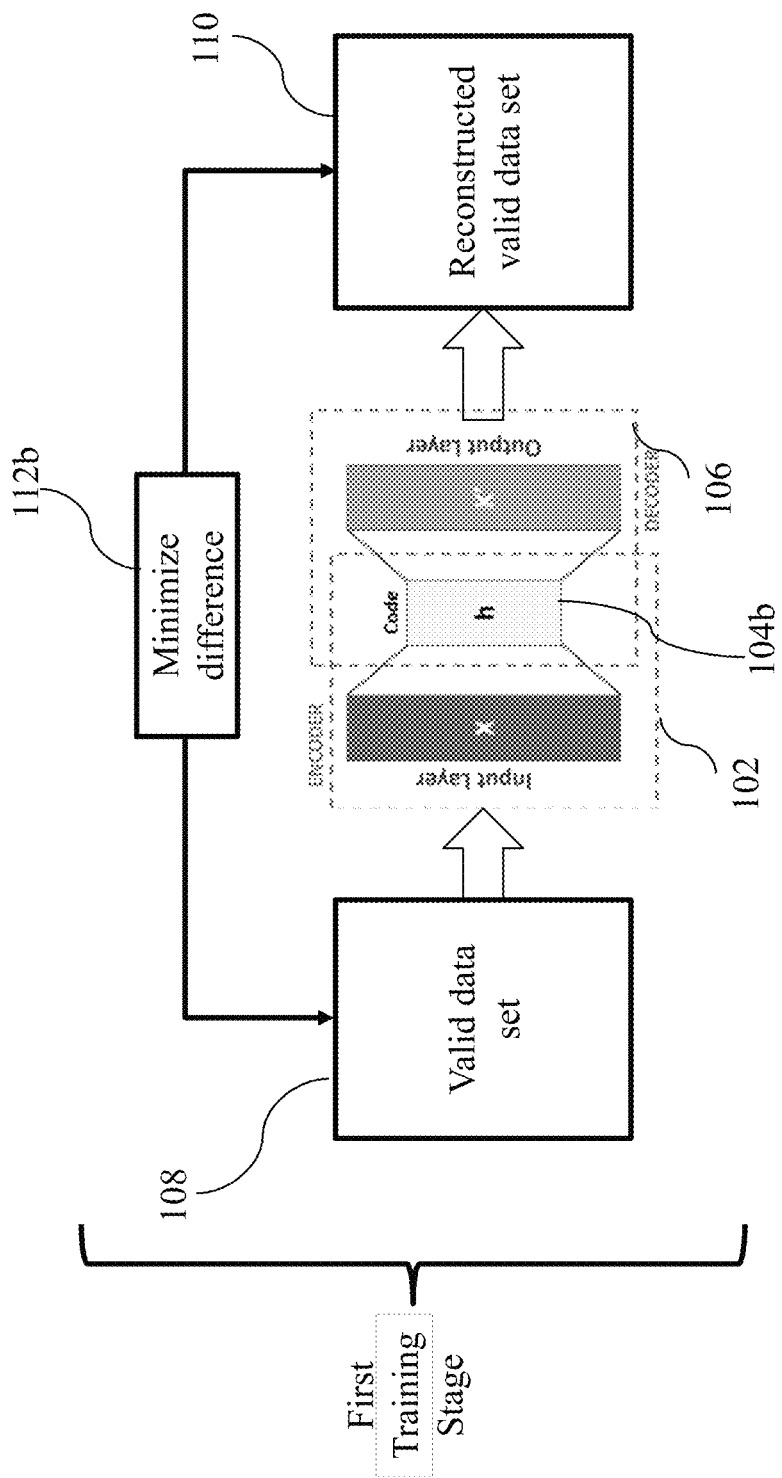
FIG. 1B shows a schematic of a first training stage of training of the autoencoder, according to some embodiments.
Figure 1D:
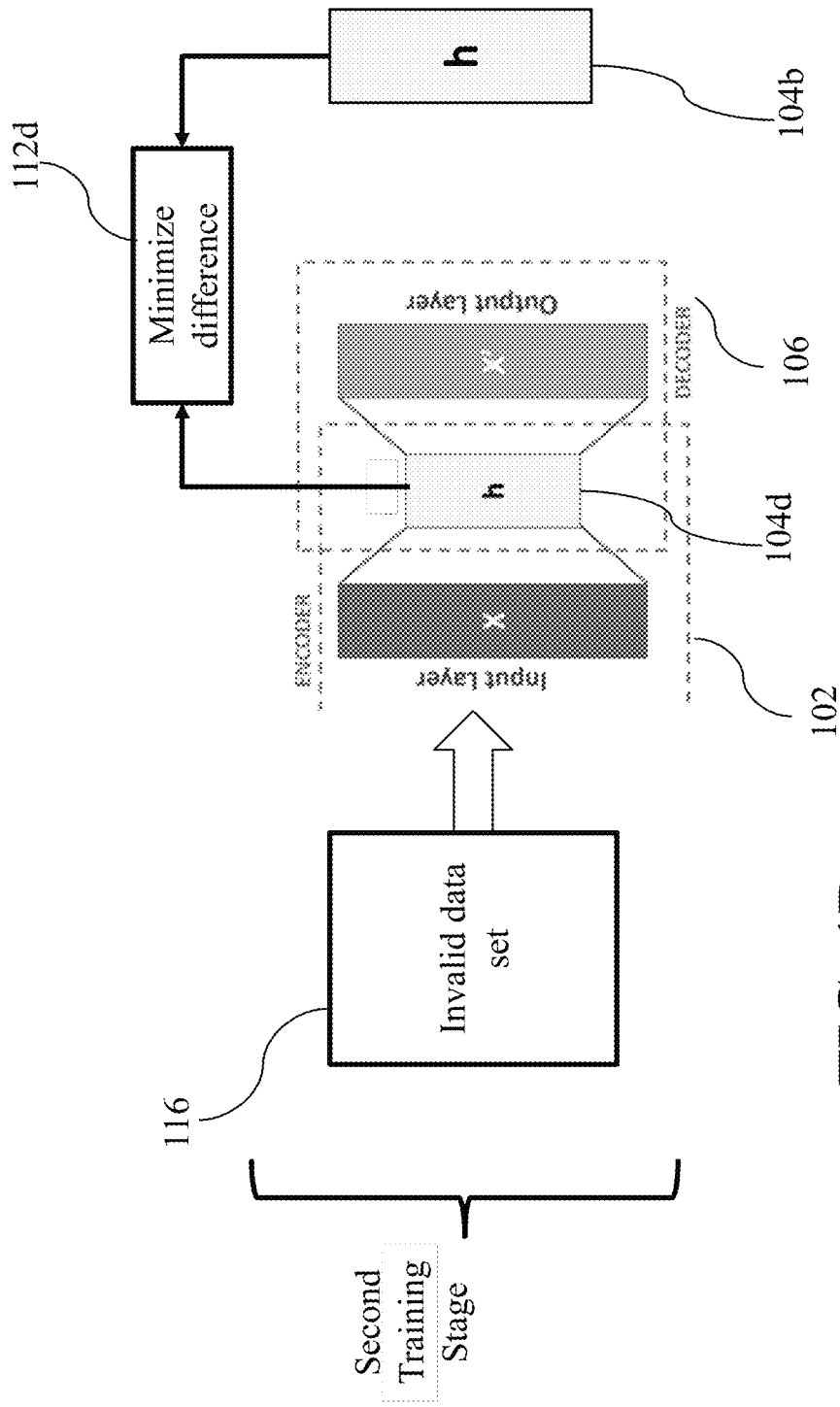
FIG. 1D shows a schematic of a second training stage of training of the autoencoder, according to some embodiments.

FIGS. 1B to 1D collectively show diagrams for multi-stage training of the autoencoder 100, according to some embodiments. The autoencoder 100 is trained in two stages, namely, a first training stage and a second training stage.

At first, a first training set is created. The first training set includes a valid data set of multiple dimensions. At an instant of time, the valid data set includes multiple valid data points having values within a range of valid values of their corresponding dimensions. For example, a given industrial system includes 'n' sensors. Measurement of each sensor, at an instant of time, corresponds to the valid data points. The measurement of each sensor (i.e., the valid data point value) is within a range of valid values of respective sensors. In an embodiment, the range of valid values may be 0.1 to 1. The time instants at which the measurements of the 'n' sensors are obtained are referred to as valid instances. Further, the valid data set is unlabeled data. Since the first training data set includes measurements of all the sensors, the first training data set may be referred to as the full data set or a full set of measurements. Further, the autoencoder 100 is trained in the first training stage using the first training data set.

FIG. 1B shows a schematic of the first training stage of training of the autoencoder 100, according to some embodiments. The valid data set 108 (i.e. unlabeled data set) is applied as input data to the encoder 102. The encoder 102 is configured to produce a latent space representation of the valid data set 108. The latent space representation 104b is a lower dimensional representation of the valid data set 108. More specifically, the latent space representation of the valid data set 108 corresponds to a labeled data set. According to an embodiment, the encoder 102 is a deep neural network. Further, the decoder 106 is configured to reconstruct the valid data set 108 from the latent space representation of the valid data set 108. To that end, the decoder 106 outputs reconstructed valid data set 110. The autoencoder 100 is trained using a reconstruction loss function that minimizes a difference 112b between the reconstructed valid data set 110 and the valid data set 108. Further, a second training dataset is created for the second training stage.

FIG. 1C shows a schematic for creating the second training dataset, according to some embodiments. For instance, a given industrial system may include nine sensors. At an instant of time, each sensor produces the valid data point (or measurements) having value within the range of valid values of respective sensors. For such a case, the valid data set 108 may include nine valid data points ($x_0, x_1 \ldots, x_9$), at a time instant, having values within the range of valid values. One or more valid data points of the valid data set 108, for example, valid data points 114a and 114b, are replaced with invalid data points. Values of the invalid data points lie outside of the range of valid values. For example, if the range of valid values is 0.1 to 1, then the values of the invalid data points can be zero ("0") which lies outside of the range of valid values. Therefore, the valid data points 114a and 114b are replaced with 0's. As a result, an invalid data set 116 is created. Therefore, the invalid data set 116 includes the valid data points ($x_0, x_1, x_2, x_3, x_4, x_7, x_8, x_9$), and invalid data points 116a and 116b having values outside of the range of valid values (e.g., zero). The second training dataset comprises the invalid data set 116.

According to an embodiment, the invalid data points 116a and 116b of zero value indicate that the measurements of 5th sensor and 6th sensor of the nine sensors are missing. Since the invalid data set 116 does not include measurements (i.e., the valid data points) of all the sensors, the invalid data set 116 may be contemplated as an incomplete data set or an incomplete set of measurements. Some embodiments are based on realization that retraining the encoder 102 with the invalid data set 116 allows the encoder 102 to learn a new mapping to map the invalid data set 116 to correct latent space representations. To that end, in the second training stage, the autoencoder 100 is trained using the second training data set.

FIG. 1D shows a schematic of the second training stage of training the autoencoder 100, according to some embodiments. In the second training stage, the latent space representations 104b produced by the encoder 102 in the first training stage is used to learn a new encoder that maps to the labeled data set (i.e. the latent space representations 104b of the valid data set 108) in the face of the missing sensor data. The invalid data set 116 is applied as input data to the encoder 102. The encoder 102 is configured to produce a latent space representation 104d of the invalid data set 116. The encoder 102 is trained using an encoding loss function that minimizes a difference 112d between the latent space representation 104d of the invalid data set 116 and the latent space representation 104b of the valid data set 110. As a result, the new encoder is produced. Some embodiments are based on the realization that the encoder 102 can be trained for different invalid data sets. For example, after the encoder 102 is retrained for the invalid data set 116, the retrained encoder is trained again for another invalid data set. As a result of such training of the encoder 102, the encoder 102 becomes a model of models.

At the end of the second training stage, the new encoder is learned. The new encoder maps to the correct latent space representation (i.e., the latent space representations of the valid data set) even in the face of the missing sensor data. In other words, the new encoder learns how to map the latent space representations of the valid data set in the face of the missing sensor data.

To that end, an embodiment, the new encoder is learned such that when the invalid data set 116 is applied to the new encoder, the new encoder produces the latent space representations of the corresponding valid data set 108. In the second training stage, only the encoder 102 is trained to learn the new encoder, and the decoder 106 remains same. Therefore, the multi-stage training of the autoencoder 100 yields an autoencoder that includes the new encoder and the decoder 106.

According to an embodiment, the multi-stage training procedure is a form of self-supervised approach, where the first training stage includes learning the latent space representations using the full data set and the second training stage includes learning how to map to the same latent space representations under missing data from different sensors. Further, in the multi-stage training procedure, the latent space representations produced in the first training stage are interpreted as labels, and only a single predictive model (the encoder 102) is optimized for the missing sensor data. Thereby, by performing the multi-stage training procedure, unsupervised approach is transformed to a supervised approach which makes the autoencoder 100 robust to the missing sensor data.

Figure 2A:
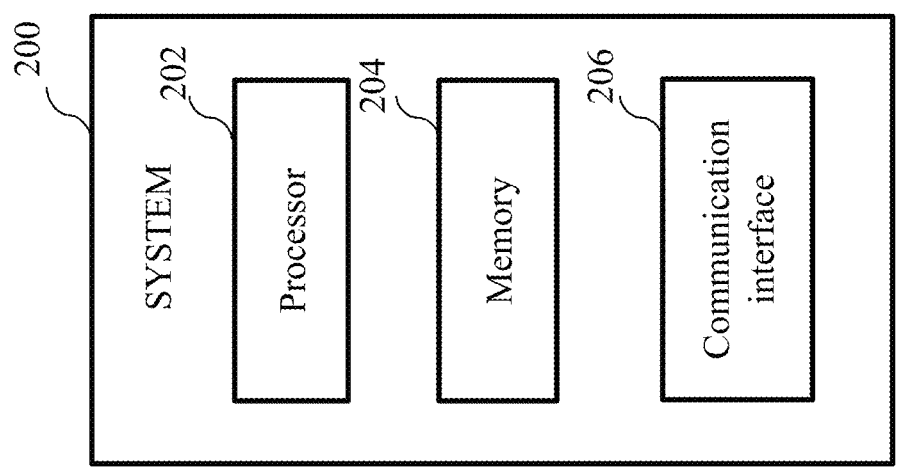
FIG. 2A is a block diagram that exemplarily illustrates a system for multi-stage training of the autoencoder, in accordance with an example embodiment.

FIG. 2A is a block diagram that exemplarily illustrates a system 200 for multi-stage training of the autoencoder 100, in accordance with an example embodiment. The system 200 may comprise a processor 202, a memory 204 and a communication interface 206. The processor 202, the memory 204 and the communication interface 206 may be communicatively coupled to each other. The processor 202 may be embodied in a number of different ways. For example, the processor 202 may be embodied as one or more of various hardware processing means such as a coprocessor, a microprocessor, a controller, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package.

The memory 204 may be non-transitory and may include, for example, one or more volatile and/or non-volatile memories. For example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 200 to carry out various functions in accordance with an example embodiment of the present disclosure. Additionally, or alternatively, the memory 204 could be configured to store instructions for execution by the processor 202.

The processor 202 may be configured to execute instructions stored in the memory 204 or otherwise accessible to the processor 202. Additionally, or alternatively, the processor 202 may be configured to execute hard coded functionality. As such, whether configured by hardware or software methods, or by a combination thereof, the processor 202 may represent an entity (for example, physically embodied in circuitry) capable of performing operations according to an embodiment of the present disclosure. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed.

The communication interface 206 may comprise input interface and output interface for supporting communications to and from one or more sensors. The communication interface 206 may be any means such as a device or circuitry embodied in either hardware or a combination of hardware and software that is configured to receive and/or transmit data to/from the one or more sensors. In this regard, the communication interface 206 may include, for example, an antenna (or multiple antennae) and supporting hardware and/or software for enabling communications with a wireless communication network. Additionally or alternatively, the communication interface 206 may include the circuitry for interacting with the antenna(s) to cause transmission of signals via the antenna(s) or to handle receipt of signals received via the antenna(s). In some environments, the communication interface 206 may alternatively or additionally support wired communication. As such, for example, the communication interface 206 may include a communication modem and/or other hardware and/or software for supporting communication via cable, digital subscriber line (DSL), universal serial bus (USB) or other mechanisms.

The processor 202 may be configured to create the first training set including the valid data set of multiple dimensions, such that each valid instance of the valid data set 108 includes multiple valid data points having values within the range of valid values of their corresponding dimensions. The processor 202 may be further configured to train the encoder 102 and the decoder 106 in the first training stage using the first training set to reduce a difference between the valid data set 108 provided to the encoder 102 and a data set decoded by the decoder 106 (i.e., the reconstructed valid data set 110). The processor 202 may be further configured to create the second training set comprising the invalid data set 116 formed by replacing at least some valid data points of the valid instances with invalid data points having values outside of the range of valid values of their corresponding dimensions. The processor 202 may be further configured to train the encoder 102 in the second training stage using the second training set to reduce a difference between encodings of the valid data instances (i.e., the latent space representation of the valid data set 108) and encodings of their corresponding invalid data instances (i.e., latent space representation of the invalid data set 116).

Figure 2B:
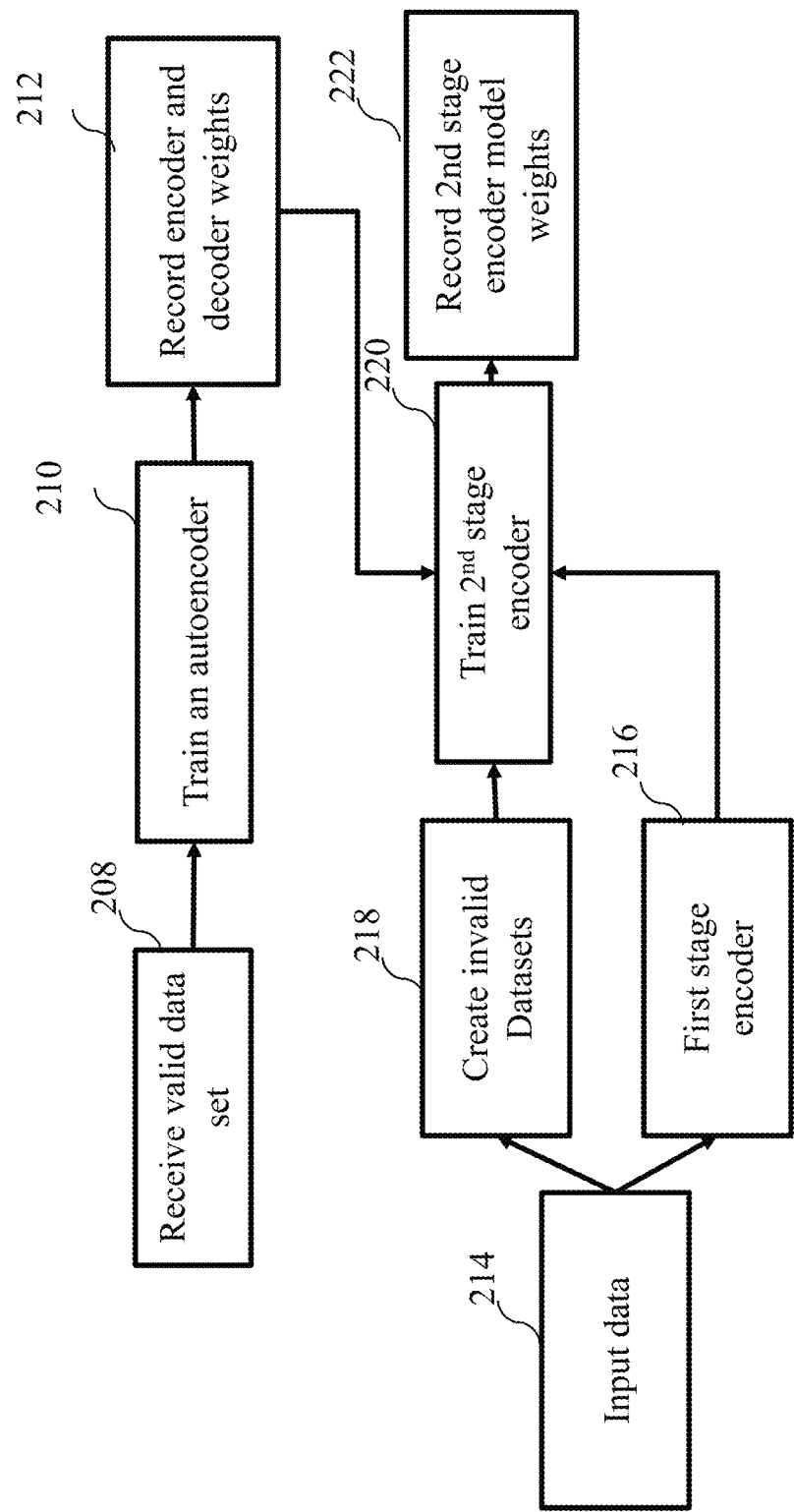
FIG. 2B shows a block diagram for multi-stage training of the autoencoder, according to some embodiments.

FIG. 2B shows a block diagram for the multi-stage training of the autoencoder 100, according to some embodiments. At block 208, the processor 202 receives the valid dataset. At block 210, the processor 202 trains, using the received valid data set, the encoder 102 and the decoder 106 of the autoencoder 100 as described above with reference to FIG. 1B. As a result such training, weights of the encoder 102 and the decoder 106, which represent a first training stage model, are produced. At block 212, the weights of the encoder 102 and the decoder 106 are recorded in a memory, for example, the memory 204 of the system 200. Further, at block 214, the processor 202 receives input data. In an embodiment, the input data may correspond to sensor measurements. At block 216, the processor inputs the input data into the encoder of the first training stage model which produces desired latent space representation. Additionally, at block 218, the processor generates a series of invalid data sets based on the input data. At block 220, the processor trains a second stage encoder for each invalid dataset to map from the invalid dataset to the latent space representation, as described above with reference to FIG. 1D. As a result of such training, weights of the second stage encoder are produced. At block 222, the weights of the second stage encoder are recorded in the memory. In an embodiment, the weights of the second stage encoder are warm started with the weights of the encoder of the first training stage model. Such training process of the second stage encoder is repeated for each invalid dataset of the input data and outcome is the weights of the second stage encoder.

Data Recovery System

In some embodiments, the industrial systems are provided with a monitoring system whose goal is to monitor an operation of the industrial systems and detect anomalies. Additionally, the industrial systems are provided with a controller configured to control an operation of the industrial system. The measurements of all the sensors associated with the industrial system are used in a monitoring algorithms employed by the monitoring system. However, under certain circumstances, one or more sensors may become inaccessible, due to which the measurements of the inaccessible sensors are not obtained. Therefore, the monitoring algorithms are input with partial measurements. However, the monitoring algorithms may not work effectively in face of the partial measurements. Similarly, the controller may not work effectively in face of the partial measurements. To that end, some embodiments aim to provide the measurements of all the sensors to the monitoring systems and the controllers, even when measurements of the one or more sensors are missing.

Some embodiments are based on recognition that the autoencoder 100 trained according to the multi-stage training procedure can be used to recover the missing measurements. To that end, some embodiments aim to formulate a data recovery system based on the autoencoder 100 trained according to the multi-stage training procedure, for recovering the missing measurement.

Figure 3:
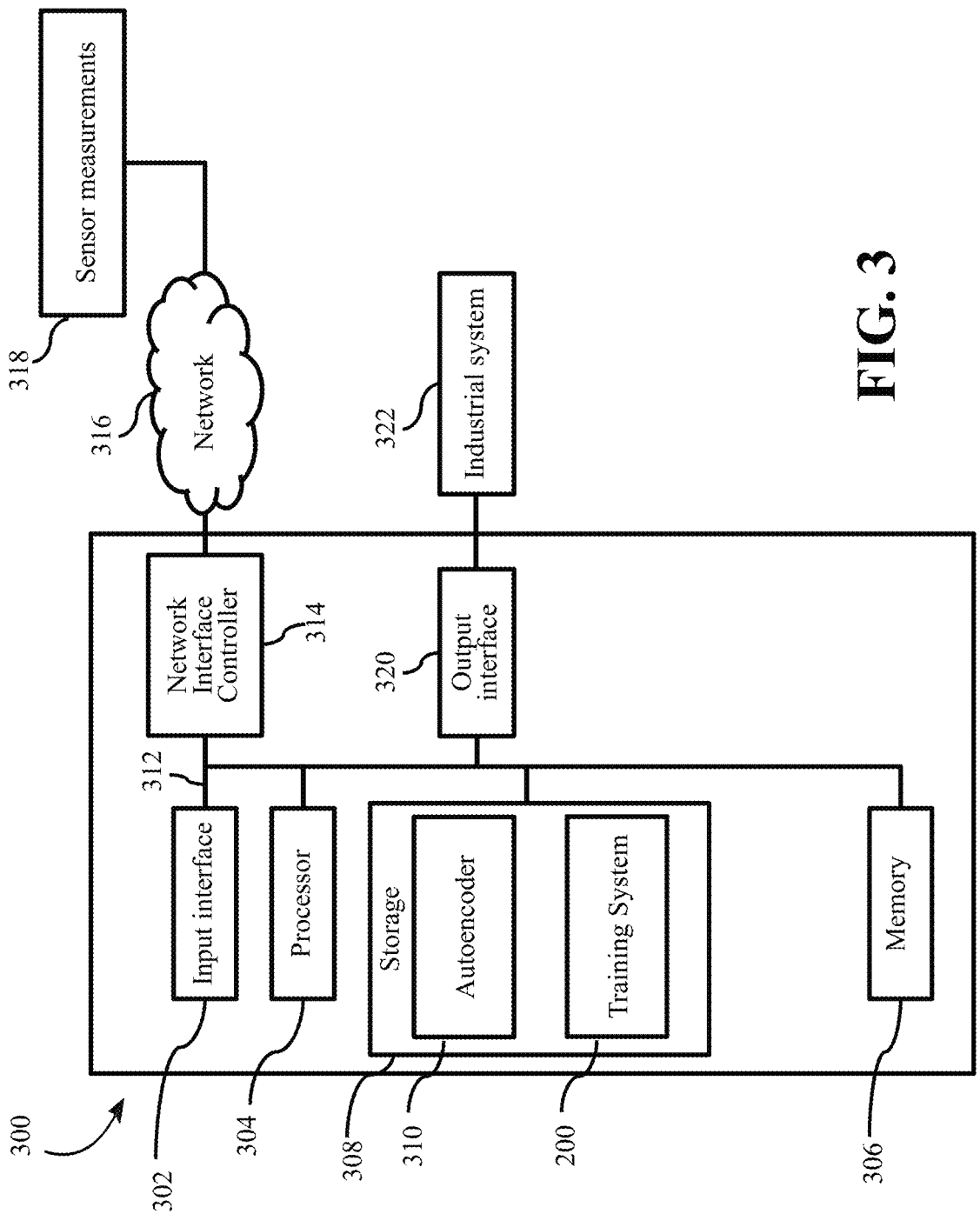
FIG. 3 shows a block diagram of a data recovery system for producing a full set of measurements of a set of sensors from an incomplete set of measurements missing a measurement from at least one sensor in the set of sensors, according to some embodiments.

FIG. 3 shows a block diagram of the data recovery system, according to some embodiments. The data recovery system 300 can have a number of interfaces connecting the data recovery system 300 with other systems and devices. For example, a network interface controller (NIC) 314 is adapted to connect the data recovery system 300, through a bus 312, to a network 316. Through the network 316, either wirelessly or through wires, the data recovery system 300 may receive measurements 318 of a set of sensors associated with the industrial systems. Additionally or alternatively, the sensor measurements 318 may be received via an input interface 302. In an embodiment, the sensor measurements 318 may correspond to an incomplete set of measurements missing a measurement from at least one sensor in the set of sensors.

The data recovery system 300 includes a processor 304 configured to execute stored instructions, as well as a memory 306 that stores instructions that are executable by the processor 304. The processor 304 can be a single core processor, a multi-core processor, a computing cluster, or any number of other configurations. The memory 306 can include random access memory (RAM), read only memory (ROM), flash memory, or any other suitable memory systems. The processor 304 is connected through the bus 312 to one or more input and output devices. Further, the data recovery system 300 includes a storage device 308 adapted to store different modules storing executable instructions for the processor 304. The storage device 308 can be implemented using a hard drive, an optical drive, a thumb drive, an array of drives, or any combinations thereof.

The storage device 308 is configured to store an autoencoder 310. The autoencoder 310 refers to a neural network having an autoencoder architecture trained based on the multi-stage training procedure. The multi-stage training procedure is described above with reference to FIGS. 1B to 1D. The autoencoder 310 includes an encoder configured to encode the full sets of measurements with missing measurements replaced by invalid values into a latent space. The autoencoder 310 further includes a decoder configured to decode, from the latent space, the full set of measurements with recovered values of the missing measurements.

In some embodiments, the processor 304 is configured to replace the missing measurement in the incomplete set of measurements with an invalid value outside of a range of valid values of the missing measurement to complete the incomplete set of measurements. The processor 304 is further configured to process the completed set of measurements using the autoencoder 310 to produce the full set of measurements with a recovered value of the missing measurement. The processor 304 is further configured to output the full set of measurements with the recovered value of the missing measurement.

In some embodiments, the trained autoencoder 310 is provided to the system 300, e.g., through the network 316.

Additionally or alternatively, the system 300 includes the training system 200 for training the autoencoder 310 on site for specific configuration of the data relevant to the industrial system 322.

Additionally, the data recovery system 300 may include an output interface 320. In some implementations, the data recovery system 300 is configured to submit, via the output interface 320, the full set of measurements with the recovered value of the missing measurement. In some embodiments, the data recovery system 300 is integrated with an industrial system 322. The industrial system 322 may correspond to the power plant, SCADA system, HVAC system, Internet of Things (IoT), or the like The data recovery system 300 is configured to submit, via the output interface 320, the full set of measurements with the recovered value of the missing measurement to the industrial system 322.

In an embodiment, the data recovery system 300 is configured to submit, via the output interface 320, the full set of measurements with the recovered value of the missing measurement to an anomaly detector associated with the industrial system 322. In some embodiments, the data recovery system 300 is configured to submit, via the output interface 320, the full set of measurements with the recovered value of the missing measurement to a controller associated with the industrial system 322. In some embodiments, the data recovery system 300 is configured to submit, via the output interface 320, the full set of measurements with the recovered value of the missing measurement to a monitoring system associated with the industrial system 322.

Figure 4:
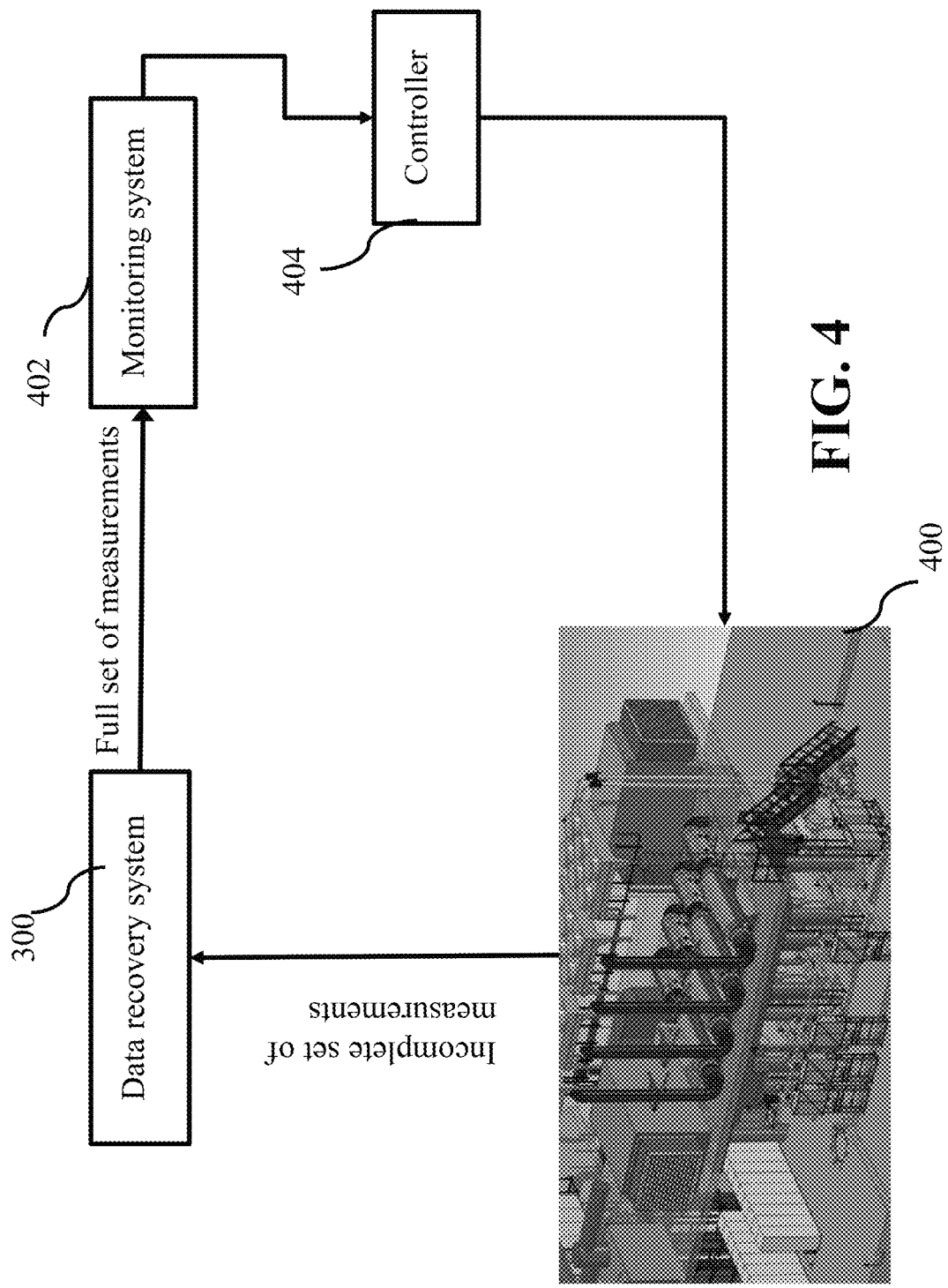
FIG. 4 shows a schematic for anomaly detection in a power plant using the data recovery system, according to some embodiments.

FIG. 4 shows a schematic for anomaly detection in the power plant 400 using the data recovery system 300, according to some embodiments. The power plant 400 includes a set of sensors. However, one or more sensors of the set of sensors may be inaccessible. Therefore, an incomplete set of measurements missing a measurement from at least one sensor in the set of sensors is obtained and is input to the data recovery system 300. The data recovery system 300 is configured to produce a full set of measurements with a recovered value of the missing measurement, using the autoencoder 310 trained based on the multi-stage training procedure. Consequently, the data recovery system 300 outputs the full set of measurements with the recovered value of the missing measurement.

Further, the full set of measurements with the recovered value of the missing measurement produced by the data recovery system 300 is applied to an monitoring system 402. Therefore, even in the case of missing measurements, the monitoring system 402 is provided with the full set of measurements.

The monitoring system 402 is configured to monitor an operation of the power plant 400. In addition, the monitoring system 402 is configured to detect an anomaly in an operation of the power plant 400 by comparing value of each measurement of the full set of measurements with corresponding threshold values. In an embodiment, if the value of a measurement in the full set of measurements is above the corresponding threshold value, then it is inferred that there exists the anomaly in an operation of the power plant 400. In response to the detection of the anomaly, the monitoring system 402 transmits anomaly information to a controller 404. The controller 404 is configured to control the operation of the power plant 400 based on the anomaly information. For example, the controller 404 may generate control commands, based on the anomaly information, for one or more pieces of equipment of the power plant 400 to resolve the anomaly and operate the power plant 400 in normal conditions. In some embodiments, the controller 404 may stop the operation of the power plant 400, upon the detection of the anomaly.

Similarly, the data recovery system 300 can be adopted in other industrial systems such as the SCADA system, the HVAC system, and Internet of Things (IoT), for other operations such as optimization of the industrial systems. In some embodiments, the multi-stage training procedure and/or the autoencoder 100 trained according to the multi-stage training procedure can be directly applied to the measurement and anomaly detection algorithms themselves, thereby obviating need for a precursor.

Some embodiments compare the multi-stage training procedure with an iterative imputation method. Equation (1) and equation (2) below show a flow for missing data imputation in the multi-stage training procedure and when iteratively imputing values through an autoencoder, respectively.

$$X \to E \to D \ldots \to E \to D \to \hat{X} \tag{1}$$

$$X \to E' \to D \to \hat{X} \tag{2}$$

where E refers to an encoder of an autoencoder, D refers to a decoder of the autoencoder, X refers to input data, $\hat{X}$ refers to output data, and E' refers to a second training stage encoder.

Eq. (1) shows that iterating through an ordinarily trained autoencoder requires continuous online calculations that increase computational complexity in the case of iterative imputation. On the other hand, eq. (2) shows that the multi-stage training procedure requires only a single pass through the autoencoder to impute the missing data.

Some embodiments are based on realization that it is advantageous to combine the multi-stage training procedure and the iterative imputation method. Because, while the multi-stage training procedure immediately corrects the noise, the introduction of the full data set at input of the second training stage encoder E' may lead to latent space deviations. In other words, iterating on the multi-stage trained encoder is not optimal. According to an embodiment, the multi-stage training procedure and the iterative imputation method are combined to produce a stack autoencoder (stack AE) approach given as:

$$x_o \to E_1 \to D \ldots \to E_n \to D \to \hat{X}_o, \tag{3}$$

where n is a number of iterations that can be set by a user, $E_i$ is an encoder at the i-th iteration, that may be a generally learned encoder or the second training stage encoder E'.

FIG. 5 shows a stack AE training algorithm, according to some embodiments.

The stack AE can be considered as an encoder-decoder set $\{(E, D), \{E_i\}_{i=1}^n\}$, and an indicator set $\{a_i \in \{0, 1\}\}_{i=1}^n$ to show whether $E_i$ is the encoder of an ordinary autoencoder or the second training stage encoder. In an embodiment, a greedy search is applied to choose the number of iterations n and a sequence of encoders $\{a_i\}_{i=1}^n$.

Further, advantages of the multi-stage training procedure and the iterative imputation method in different settings are described using multiple datasets. FIG. 6 is a tabular column showing details of different datasets, according to some embodiments. To evaluate the multi-stage training procedure, six open-source data sets are used. Computer numerical control (CNC) mill tool wear data set available on Kaggle, Mocap human activity recognition data set, and datasets from the UEA & UCR time series dataset repository are used. In the aforesaid data sets time series are normalized into range [0.1,0.9], so all the values after normalization are positive, and the missing data is identifiable via zero imputation. The CNC mill tool wear dataset contains experiment data from 18 experiments on a CNC in the System-level Manufacturing and Automation Research Testbed (SMART). On each machine a multivariate time series is collected from sensors and 24 dimensions of continuous time series of them are used. The data is labeled with regard to part completion, tool wear and experimental parameters. Such data is split into non-overlapping windows of 100 data points. The non-overlapping windows are shuffled and 150 windows for training data set, 50 windows in validation data set, and 50 windows in testing set are set. The validation data set is used for early termination of a learning algorithm. The labels on the data are used for mill tool wear detection. Specifically, XGboost classifier that predicts if the mill tool is worn is learned. The XGboost classifier is learned on the training data set with complete data. During test, a number of missing sensors is considered to be $k \in \{5, 10, 15, 20\}$.

Motion capture database is a comprehensive database of recorded human activities such as walking, running, etc. For each activity, a video of the participant is converted to a 93 dimensional multidimensional time series of body joint positions (x, y, z) throughout the video. Resulting time series represents position of 31 body joints for duration of each experiment. There are five actors performing different activities in different environments in the dataset. A window size of 100, which means that each input has dimensions 100×93, is selected. For each actor 500 data points of motion are sampled. A number of missing sensors is considered in $k \in \{10, 20, 30, 40, 50\}$. A classifier that predicts the motion that the actor is performing is learned and for each k normalized root-mean-square error (NRMSE) and accuracy for the classifier with imputed data input is reported.

Based on considered problem setting and selected size of the datasets, finger movements dataset, hand movement direction dataset, NATOPS dataset and racket sports dataset are selected. The finger movements dataset and the hand movement direction dataset are records of brain neuron activity of a person while the person is typing or moving their hand. The NATOPS dataset is a gesture identification dataset and generated from sensors placed on hands, elbows, wrists and thumbs of an individual who is performing six hand gestures. The dataset includes x, y, and z coordinate time series from each sensor for the gestures performed by the person. The racket sports dataset is generated from a smart watch placed on a person playing badminton or squash. The smart watch measures a position of the smart watch using an accelerometer and gyroscope.

Given an IoT/SCADA deployment with 10 sensors may have a power set of missing sensor combinations of size 1024. It is clear that training and testing models on all possible missing sensor combinations is computationally prohibitive both in total and per number of missing sensors, k. For this reason, a sample of 100 missing patterns, in, is used for training and testing for each given number of missing sensors k.

FIG. 7 shows a tabular column including network details for the stack AE, according to some embodiments. Here, the autoencoding model is a 1-dimensional convolutional AE. All stack AE models have a set maximum number of iterations, for example, four iterations. The stack AE approach is compared with other approaches such as a linear regression, a polynomial regression, GP-VAE, HI-VAE, and VAE-AC.

Results
CNC Dataset

Figure 8:
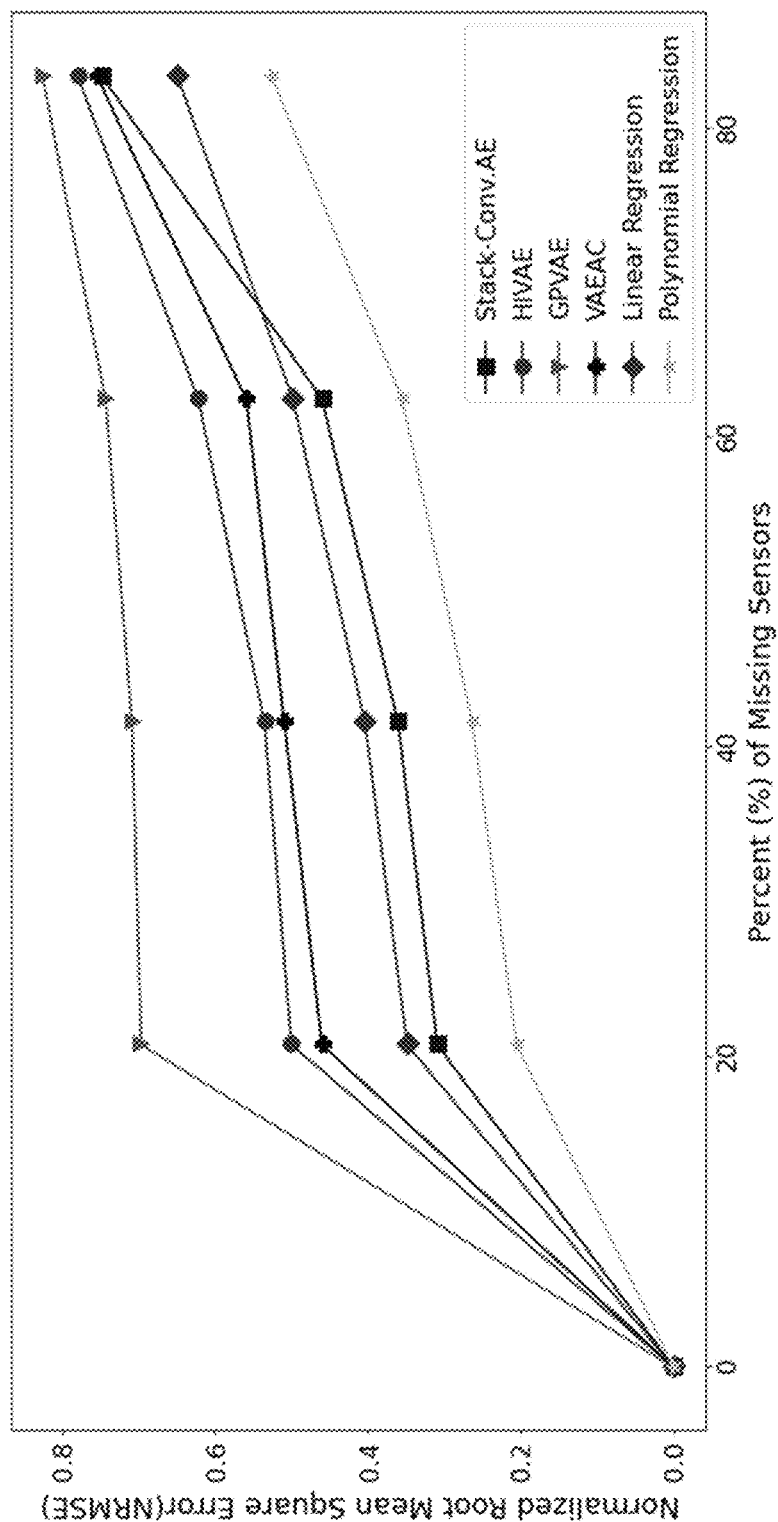
FIG. 8 illustrates normalized root-mean-square error (NRMSE) of time series imputation on a computer numerical control (CNC) tool wear dataset across for a range of missing sensor numbers, according to some embodiments.

FIG. 8 illustrates NRMSE of time series imputation on the CNC tool wear dataset across for a range of missing sensor numbers, according to some embodiments. It can be inferred from the FIG. 8 that the best performing imputation method is polynomial regression. Further, it can be noted that the latent space methods such as HI-VAE, GP-VAE, and VAE-AC perform worse than the linear regression. This is likely the case because it is difficult to choose a single latent space prior that may work well across different data sets. It can also be noted that the stack AE approach outperforms the linear regression. Such result is favorable because the stack AE model can be learned offline and therefore represents a much lower storage complexity than the linear regression.

Figure 9:
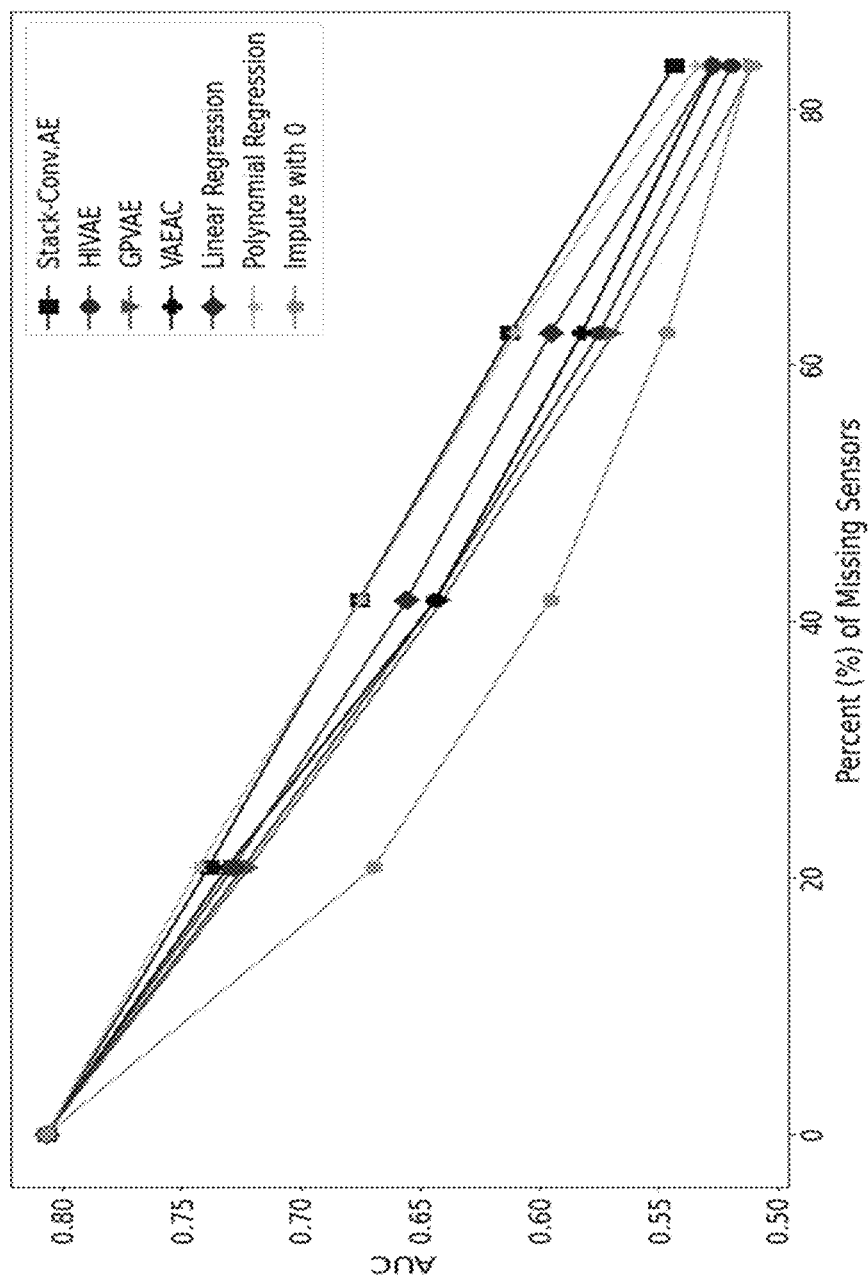
FIG. 9 shows tool wear detection AUC plot on the CNC tool wear dataset, according to some embodiments.

FIG. 9 shows tool wear detection AUC plot on the CNC tool wear dataset, according to some embodiments. It can be observed from FIG. 9 that the best AUC performance is achieved by the stack AE approach. This shows that the stack AE approach is better, particularly for a high number of missing sensors, at learning key features of the data that are helpful in wear detection.

2. Motion Capture Database

Figure 10:
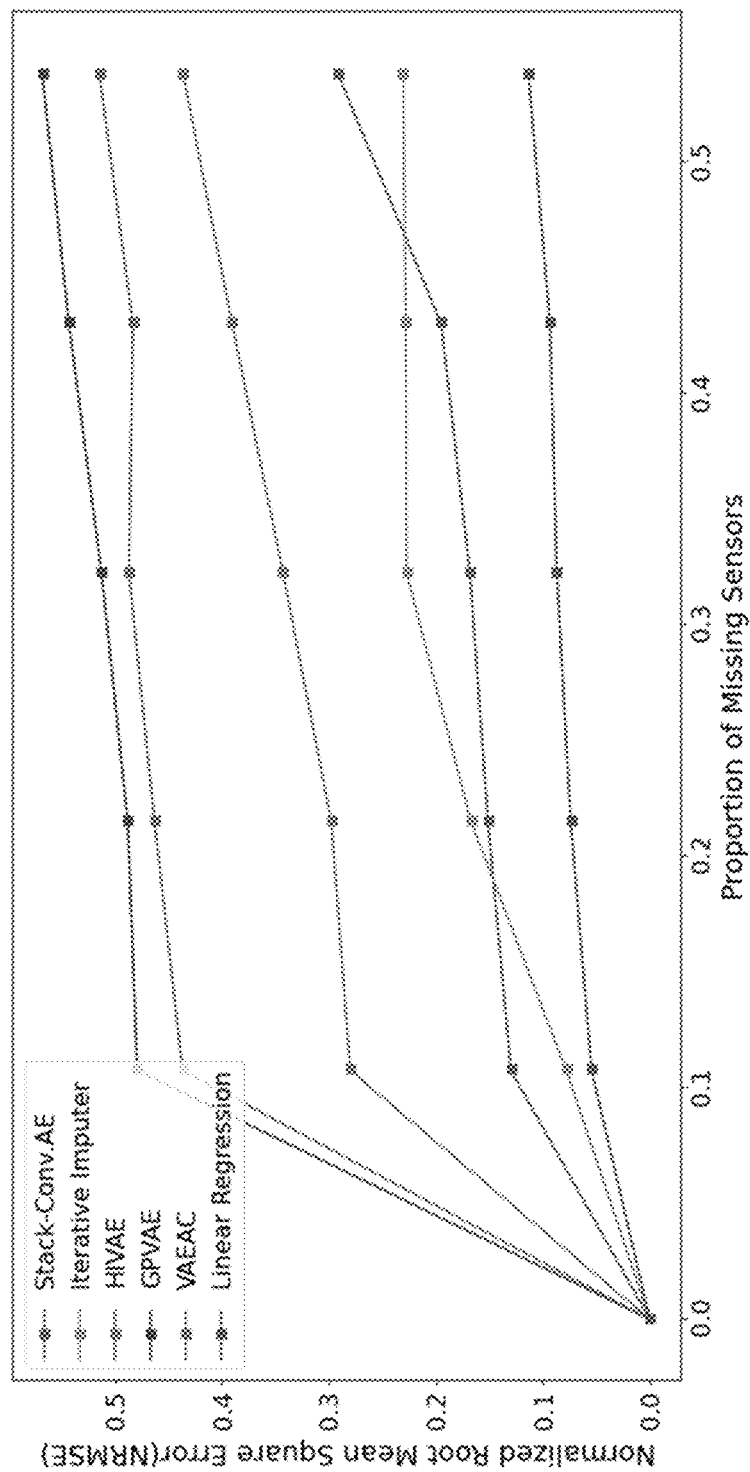
FIG. 10 shows NRMSE of time series reconstruction on human activity dataset for different missing sensor combinations, according to some embodiments.

FIG. 10 shows NRMSE of time series reconstruction on human activity dataset for different missing sensor combinations, according to some embodiments. It can be observed that the linear regression performs well on the human activity dataset, which in turn suggests that the human activity dataset exhibits strong linear correlation, and is relatively low rank which facilitates imputation by the linear regression. It can also be observed that the latent space methods perform poorly Therefore, a prior distribution choices of the latent space methods do not fit the human activity dataset.

3. UEA & UCR Repository

Figure 11:
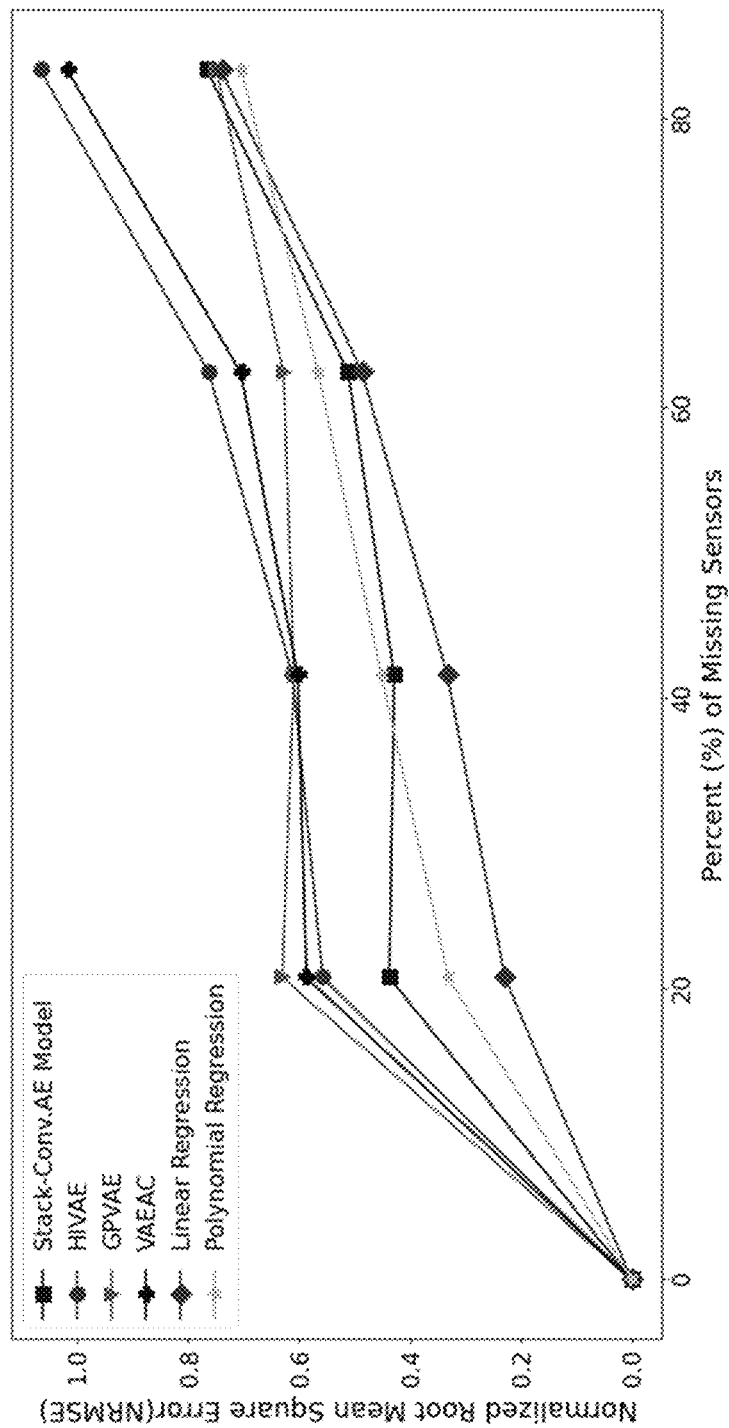
FIG. 11 shows NRMSE of time series reconstruction on NATOPS dataset for increasing numbers of missing sensors, according to some embodiments.

FIG. 11 shows NRMSE of time series reconstruction on the NATOPS dataset for increasing numbers of missing sensors, according to some embodiments. The NATOPS dataset is considered as an intermediate dataset between the Mocap database and the racket sports dataset as the NATOPS dataset includes fewer sensors than the Mocap data, but more than the racket sports dataset. Hence, there is a relatively larger amount of unobserved information which means that modeling task for statistical models is much more difficult.

It can be noted from the FIG. 11 that the linear regression is the best imputation method suggesting that there are enough sensors in the NATOPS dataset to capture a motion relationship linearly. It can also be noted from the FIG. 11 that the stack AE approach outperforms the latent space methods and is comparable to performance of the polynomial regression.

Figure 12:
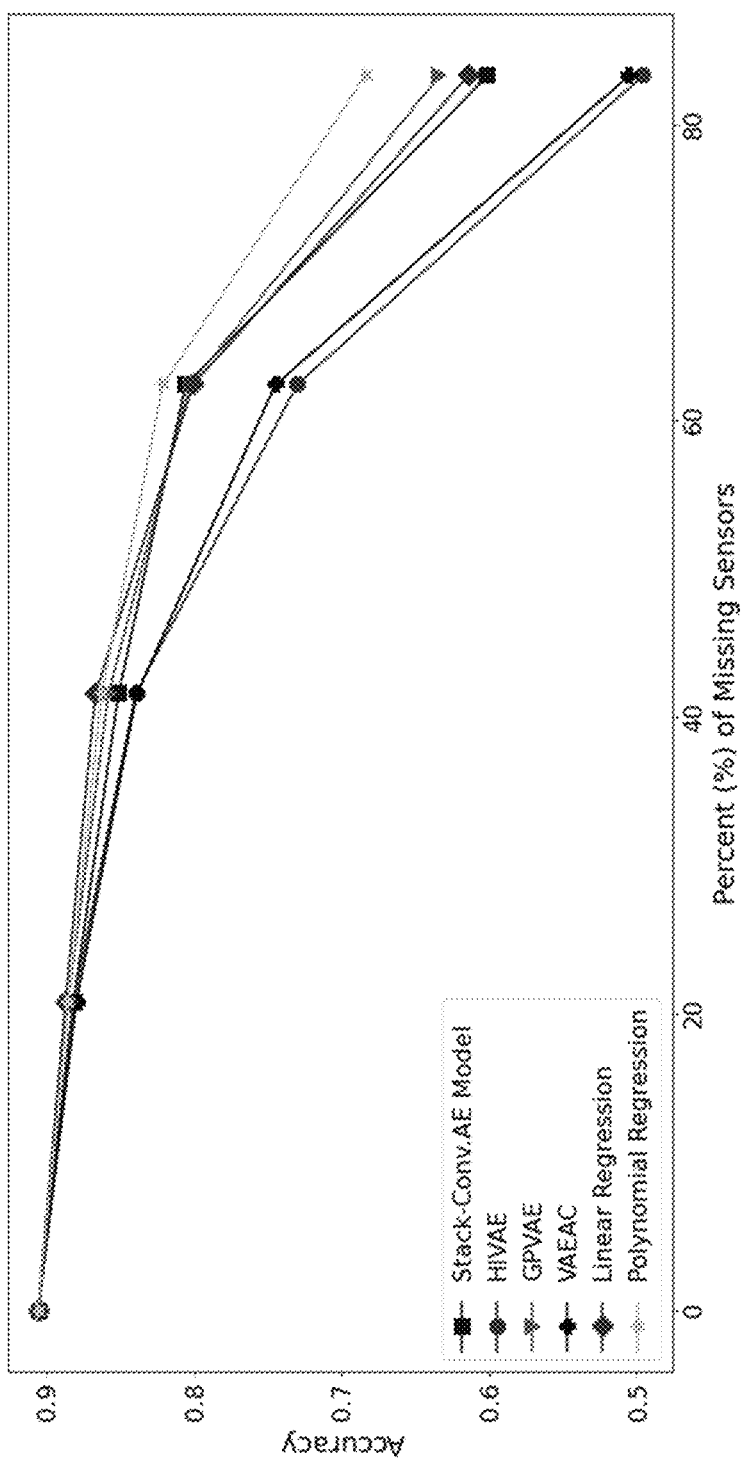
FIG. 12 illustrates classification prediction accuracy on the NATOPS dataset for increasing numbers of missing sensors, according to some embodiments.

FIG. 12 illustrates classification prediction accuracy on the NATOPS dataset for increasing numbers of missing sensors, according to some embodiments. It can be noted that from FIG. 12 that the stack AE and the polynomial regression capture data elements that result in good classification performance. It can be noted that from FIG. 12 that the stack AE approach outperforms GP-VAE.

Figure 13:
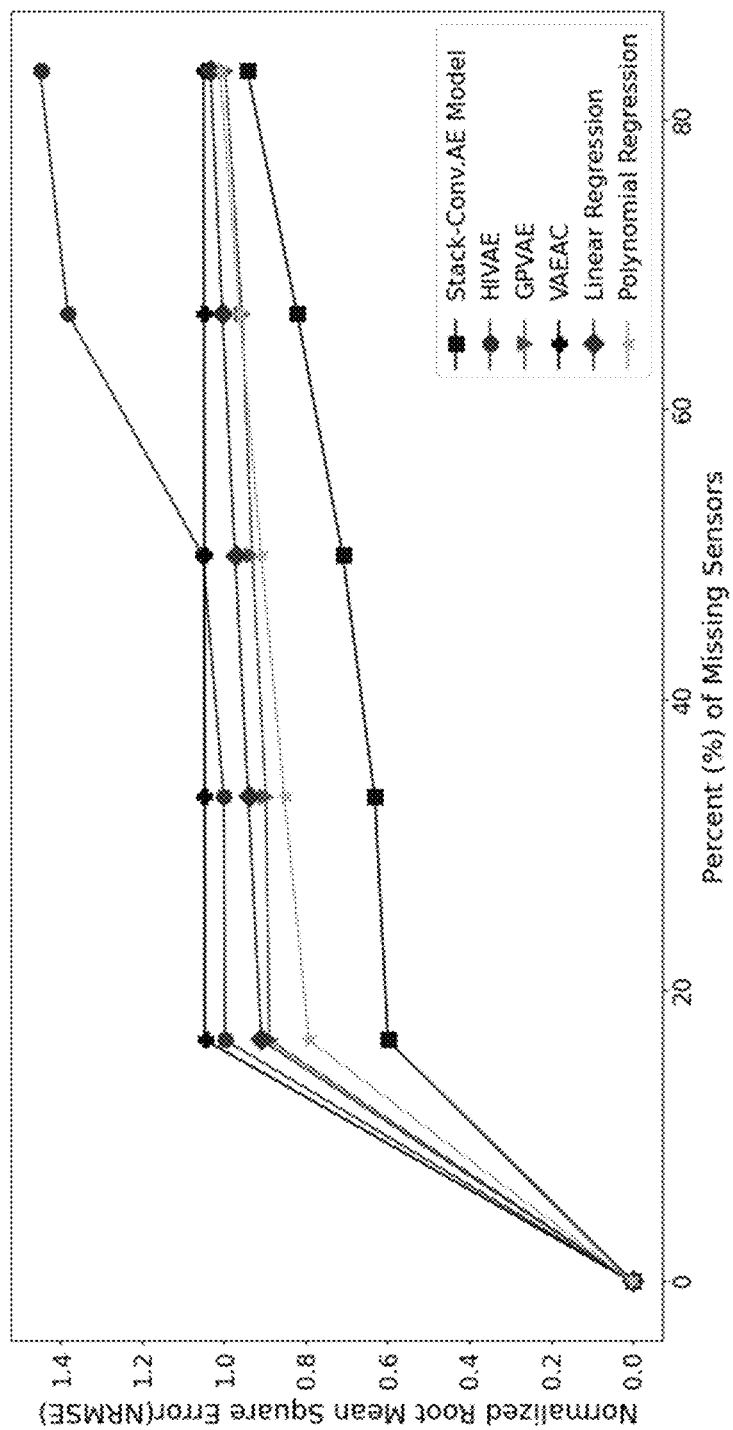
FIG. 13 illustrates NRMSE of time series reconstruction on racket sports dataset for different missing sensor combinations, according to some embodiments.

FIG. 13 illustrates NRMSE of time series reconstruction on the racket sports dataset for different missing sensor combinations, according to some embodiments. It is evident that the stack AE outperforms all other methods.

Figure 14:
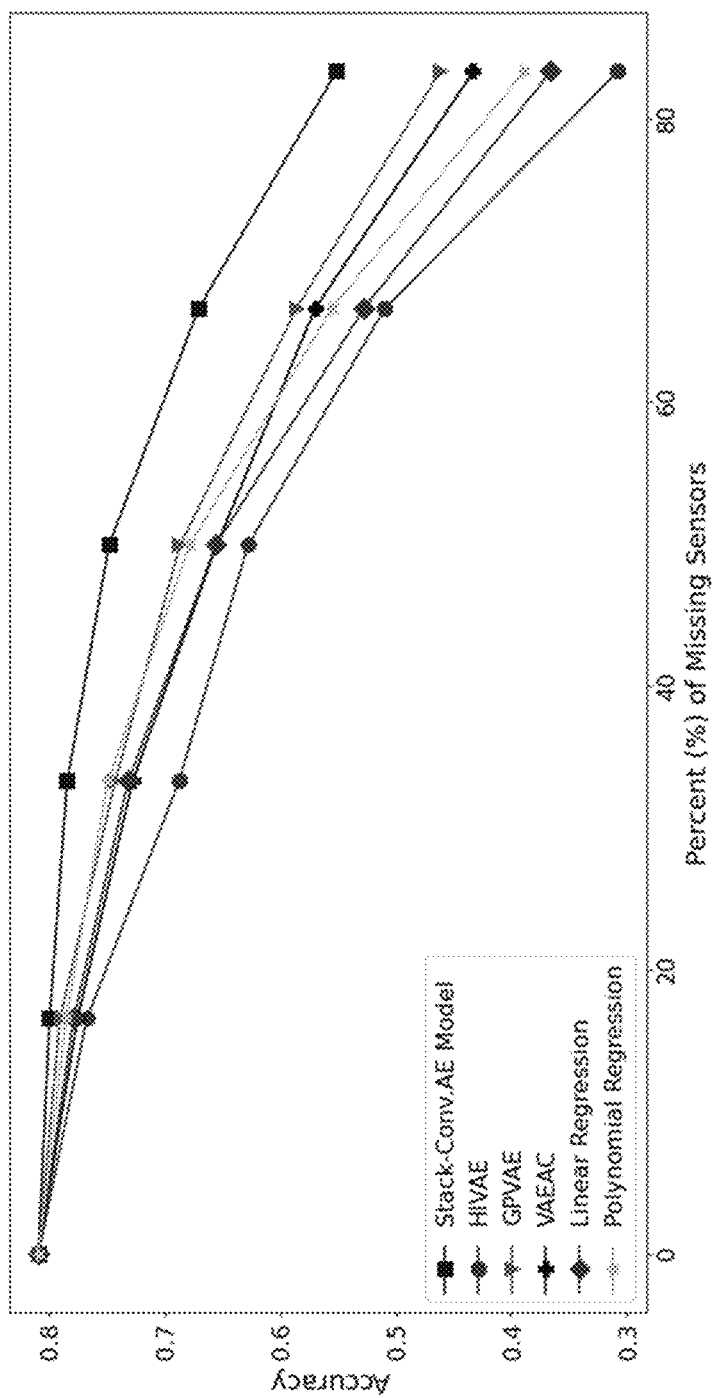
FIG. 14 illustrates prediction accuracy for classification task on the racket sports dataset for different missing sensor combinations, according to some embodiments.

FIG. 14 illustrates prediction accuracy for classification task on the racket sports dataset for different missing sensor combinations, according to some embodiments. It is evident from FIG. 14 that the stack AE approach outperforms all other methods, which in turn indicates that in the racket sports dataset (which is a highly non-linear dataset) the stack AE approach was able to capture complex relationship between the different sensors.

Figure 15:
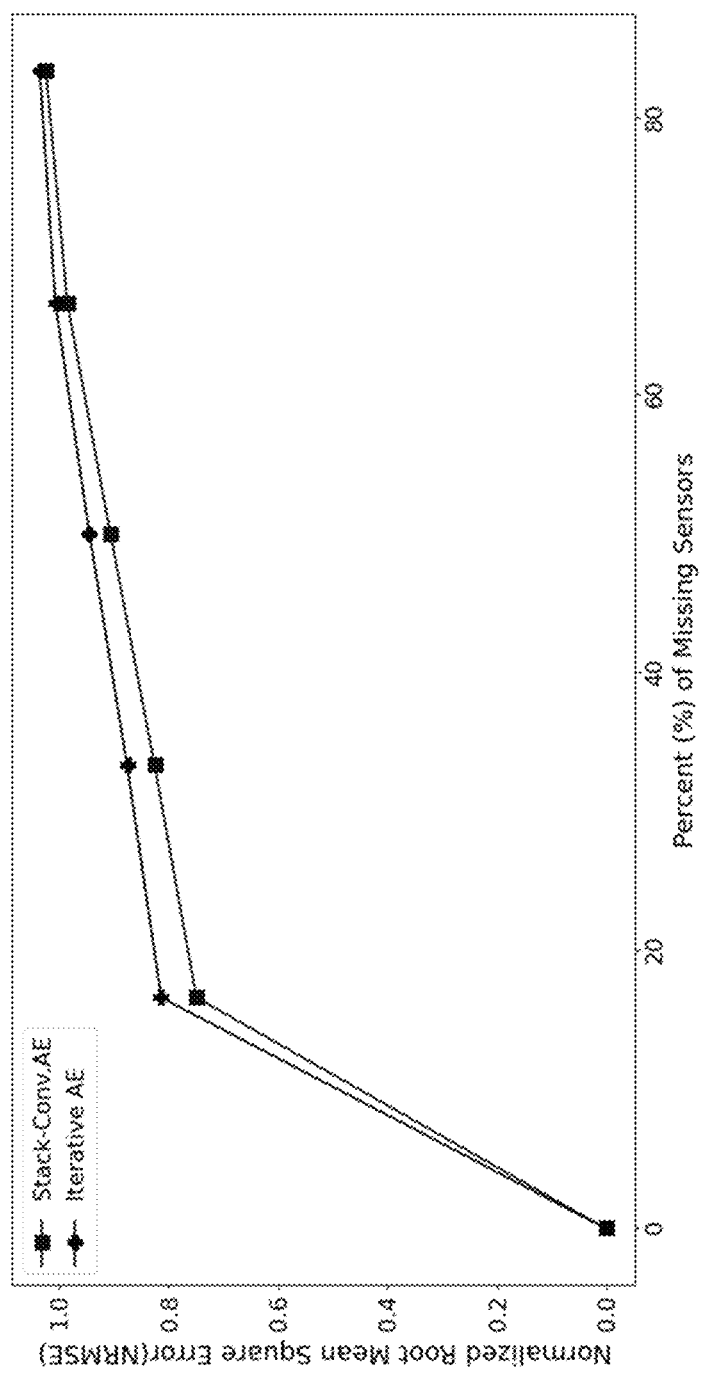
FIG. 15 illustrates NRMSE of time series reconstruction on the racket sports dataset for comparison between the stack AE and iterative-AE, according to some embodiments.

FIG. 15 illustrates NRMSE of time series reconstruction on the racket sports dataset for comparison between the stack AE approach and iterative-AE, according to some embodiments. It can be observed that the stack AE approach outperforms iterative autoencoder based imputation.

Figure 16:
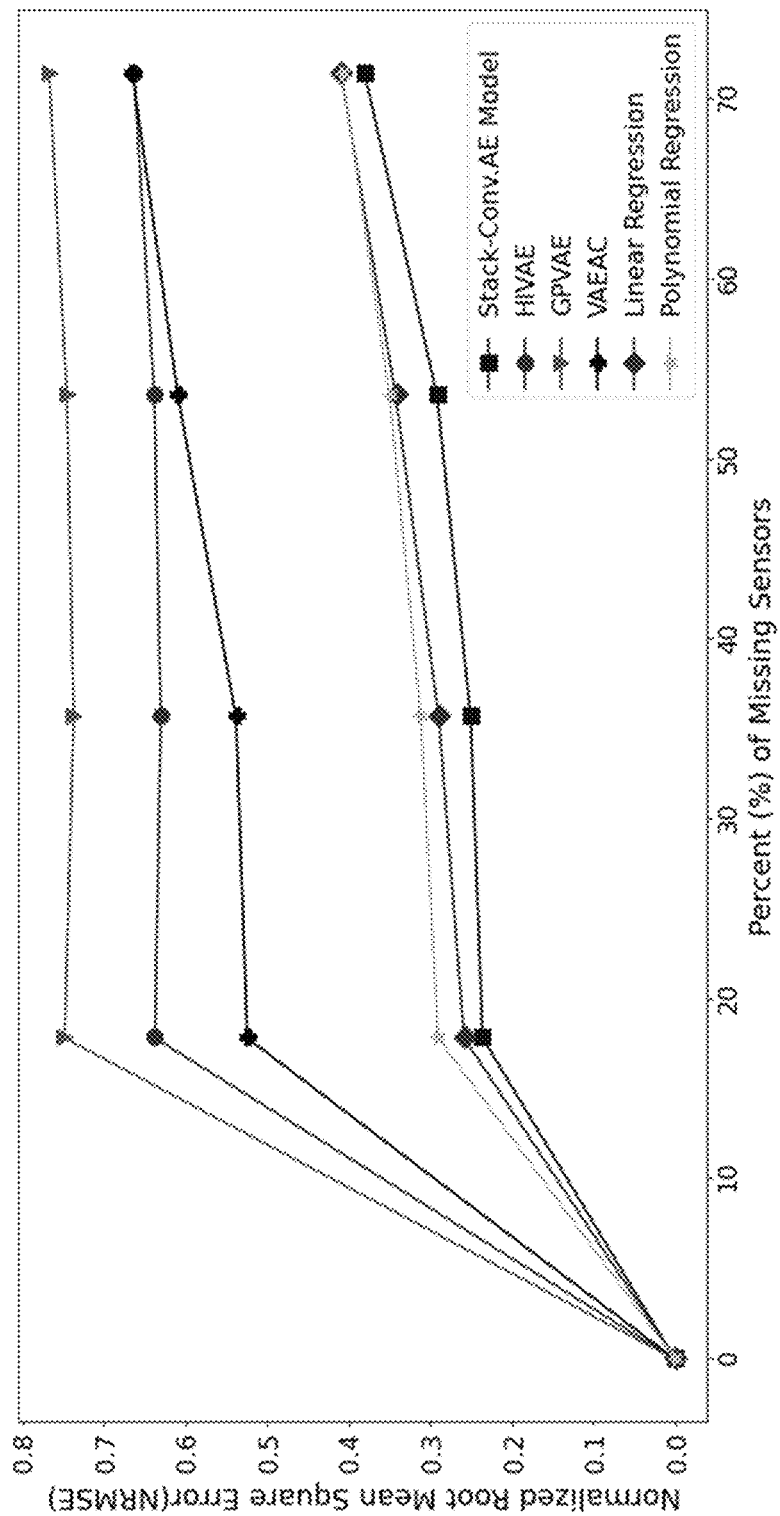
FIG. 16 shows NRMSE of time series reconstruction on finger movements dataset for different missing sensor combinations, according to some embodiments.

FIG. 16 shows NRMSE of time series reconstruction on the finger movement's dataset for different missing sensor combinations, according to some embodiments.

Figure 17:
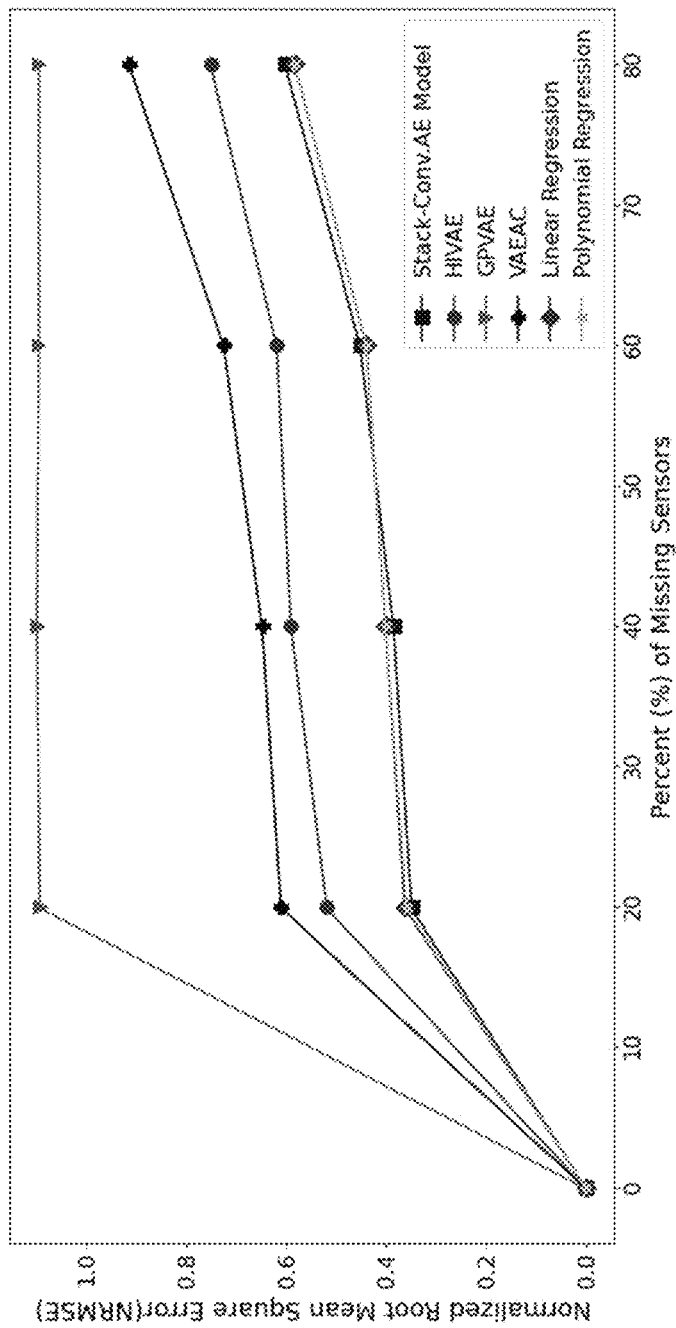
FIG. 17 shows NRMSE of time series reconstruction on hand movements direction dataset for different missing sensor combinations, according to some embodiments.

FIG. 17 shows NRMSE of time series reconstruction on the hand movement's direction dataset for different missing sensor combinations, according to some embodiments.

FIGS. 16 and 17 show that the stack AE approach performs on par with the linear and polynomial regression. This means that the stack AE approach offers a reduced storage complexity at the same level of performance as the other methods. Such a conclusion appears across all six datasets. In addition, for datasets where the imputation quality can be evaluated based on a classification task, the stack AE approach is always the top performing approach.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A computer-implemented method of training a neural network with an autoencoder architecture including an encoder for encoding its inputs into a latent space and a decoder for decoding the encodings from the latent space, comprising:
    creating a first training set including a valid data set of multiple dimensions, such that each valid instance of the valid data set includes multiple valid data points having values within a range of valid values of their corresponding dimensions;
    training the encoder and the decoder of the neural network in a first training stage using the first training set to reduce a difference between the valid data set provided to the encoder and a data set decoded by the decoder;
    creating a second training set comprising an invalid data set formed by replacing at least some valid data points of the valid instances with invalid data points having values outside of the range of valid values of their corresponding dimensions; and
    training the encoder of the neural network in a second training stage using the second training set to reduce a difference between encodings of the valid data instances and encodings of their corresponding invalid data instances.

2. The computer-implemented method of claim 1, wherein, in the first training stage, the difference between the valid data set provided to the encoder and the data set decoded by the decoder is reduced using a reconstruction loss function.

3. The computer-implemented method of claim 1, wherein, in the second training stage, the difference between the encodings of the valid data instances and the encodings of their corresponding invalid data instances is reduced using an encoding loss function.

4. The computer-implemented method of claim 1, wherein the values of the invalid data points are zeros when the values of valid data points are scaled to always be positive.

5. The computer-implemented method of claim 1, wherein the second training stage updates the encoder only while preserving the decoder trained during the first training stage.

6. A method for producing a full set of measurements of a set of sensors from an incomplete set of measurements missing a measurement from at least one sensor in the set of sensors using the neural network trained according to the computer-implemented method of claim 1, comprising:
  replacing the missing measurement in the incomplete set of measurements with an invalid value outside of a range of valid values of the missing measurement to complete the incomplete set of measurements;
  processing the completed set of measurements with the neural network to produce the full set of measurements with the recovered value of the missing measurement; and
  outputting the full set of measurements.

7. The method of claim 6, wherein the missing measurement is replaced with zero.

8. The method of claim 6, wherein the neural network includes an encoder configured to encode the full sets of measurements with missing measurements replaced by invalid values into a latent space, and a decoder configured to decode, from the latent space, the full set of measurements with recovered values of the missing measurements.

9. A system for training a neural network with an autoencoder architecture including an encoder for encoding its inputs into a latent space and a decoder for decoding the encodings from the latent space, comprising: at least one processor; and memory having instructions stored thereon that, when executed by the at least one processor, cause the system to:
  create a first training set including a valid data set of multiple dimensions, such that each valid instance of the valid data set includes multiple valid data points having values within a range of valid values of their corresponding dimensions;
  train the encoder and the decoder of the neural network in a first training stage using the first training set to reduce a difference between the valid data set provided to the encoder and a data set decoded by the decoder;
  create a second training set comprising an invalid data set formed by replacing at least some valid data points of the valid instances with invalid data points having values outside of the range of valid values of their corresponding dimensions; and
  train the encoder of the neural network in a second training stage using the second training set to reduce a difference between encodings of the valid data instances and encodings of their corresponding invalid data instances.

10. The system of claim 9, wherein the values of the invalid data points are zeros.

11. A data recovery system for producing a full set of measurements of a set of sensors from an incomplete set of measurements missing a measurement from at least one sensor in the set of sensors, comprising: at least one processor; and memory having instructions stored thereon that, when executed by the at least one processor, cause the data recovery system to:
  replace the missing measurement in the incomplete set of measurements with an invalid value outside of a range of valid values of the missing measurement to complete the incomplete set of measurements;
  process the completed set of measurements using an autoencoder to produce the full set of measurements with a recovered value of the missing measurement, wherein the autoencoder is a neural network learned based on a multi-stage training procedure; and
  output the full set of measurements with the recovered value of the missing measurement.

12. The data recovery system of claim 11, wherein the autoencoder includes an encoder configured to encode the full sets of measurements with missing measurements replaced by invalid values into a latent space, and a decoder configured to decode, from the latent space, the full set of measurements with recovered values of the missing measurements.

13. The data recovery system of claim 12,
  wherein the multi-stage training procedure includes a first training stage, and
  wherein the first training stage comprises:
    creating a first training set including a valid data set of multiple dimensions, such that each valid instance of the valid data set includes multiple valid data points having values within a range of valid values of their corresponding dimensions; and
    training the encoder and the decoder of the autoencoder using the first training set to reduce a difference between the valid data set provided to the encoder and a data set decoded by the decoder.

14. The data recovery system of claim 13,
  wherein the multi-stage training procedure includes a second training stage, and
  wherein the second training stage comprises:
    creating a second training set comprising an invalid data set formed by replacing at least some valid data points of the valid instances with invalid data points having values outside of the range of valid values of their corresponding dimensions; and
    training the encoder of the neural network using the second training set to reduce a difference between encodings of the valid data instances and encodings of their corresponding invalid data instances.

* * * * *